(12) United States Patent
Patchava et al.

(10) Patent No.: US 12,177,842 B2
(45) Date of Patent: Dec. 24, 2024

(54) ORTHOGONAL TIME FREQUENCY SPACE PRECODING OF CONTROL CHANNEL AND SHARED CHANNEL COMMUNICATIONS

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 17/644,502

(22) Filed: Dec. 15, 2021

(65) Prior Publication Data

US 2023/0189265 A1 Jun. 15, 2023

(51) Int. Cl.
| | |
|---|---|
| *H04W 72/04* | (2023.01) |
| *H04B 7/01* | (2006.01) |
| *H04B 7/0456* | (2017.01) |
| *H04W 72/044* | (2023.01) |
| *H04W 72/20* | (2023.01) |

(52) U.S. Cl.
CPC ............. *H04W 72/20* (2023.01); *H04B 7/01* (2013.01); *H04B 7/0456* (2013.01); *H04W 72/044* (2013.01)

(58) Field of Classification Search
CPC ..... H04B 7/01; H04B 7/0456; H04L 27/2602; H04L 27/2639; H04L 27/26532; H04L 5/0044; H04W 72/044; H04W 72/20
See application file for complete search history.

(56) References Cited

U.S. PATENT DOCUMENTS

| | | | |
|---|---|---|---|
| 2021/0153168 A1 | 5/2021 | Sarkis et al. | |
| 2022/0304032 A1* | 9/2022 | Hahn | H04W 76/14 |
| 2022/0385344 A1* | 12/2022 | Großmann | H04B 7/0478 |
| 2023/0101824 A1* | 3/2023 | Baek | H04W 4/40 |
| | | | 455/522 |
| 2024/0147503 A1* | 5/2024 | Shimezawa | H04W 76/14 |

FOREIGN PATENT DOCUMENTS

EP 3780411 A1 * 2/2021 ........... H04B 7/0478

OTHER PUBLICATIONS

International Search Report and Written Opinion—PCT/US2022/079956—ISA/EPO—Feb. 24, 2023.

(Continued)

*Primary Examiner* — Awet Haile
(74) *Attorney, Agent, or Firm* — QUALCOMM Incorporated

(57) ABSTRACT

Various aspects of the present disclosure generally relate to wireless communication. In some aspects, a user equipment (UE) may precode a physical sidelink control channel (PSCCH) communication using a first delay-Doppler precoder. The UE may precode a physical sidelink shared channel (PSSCH) communication using one or more second delay-Doppler precoders. The UE may transmit the PSCCH communication and the PSSCH communication in a slot after precoding the PSCCH communication and the PSSCH communication. Numerous other aspects are described.

30 Claims, 17 Drawing Sheets

(56) References Cited

OTHER PUBLICATIONS

MCC Support: "Draft Report of 3GPP TSG RAN WG1 #86 v0.2.0", 3GPP TSG RAN WG1 Meeting #86bis, 3rd Generation Partnership Project, Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Sep. 12, 2016, 153 Pages, XP051158280, p. 76.

R. Hadani, et al.; "Orthogonal Time Frequency Space Modulation"; Aug. 1, 2018; pp. 1-13; IEE WCNC 2017; https://arxiv.org/abs/1808.00519v1.

\* cited by examiner

ORTHOGONAL TIME FREQUENCY SPACE PRECODING OF CONTROL CHANNEL AND SHARED CHANNEL COMMUNICATIONS

FIELD OF THE DISCLOSURE

Aspects of the present disclosure generally relate to wireless communication and to techniques and apparatuses for orthogonal time frequency space (OTFS) precoding of control channel and shared channel communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-12B are diagrams illustrating examples associated with OTFS precoding and decoding of control channel and shared channel communications, in accordance with the present disclosure.

SUMMARY

Figure 1:
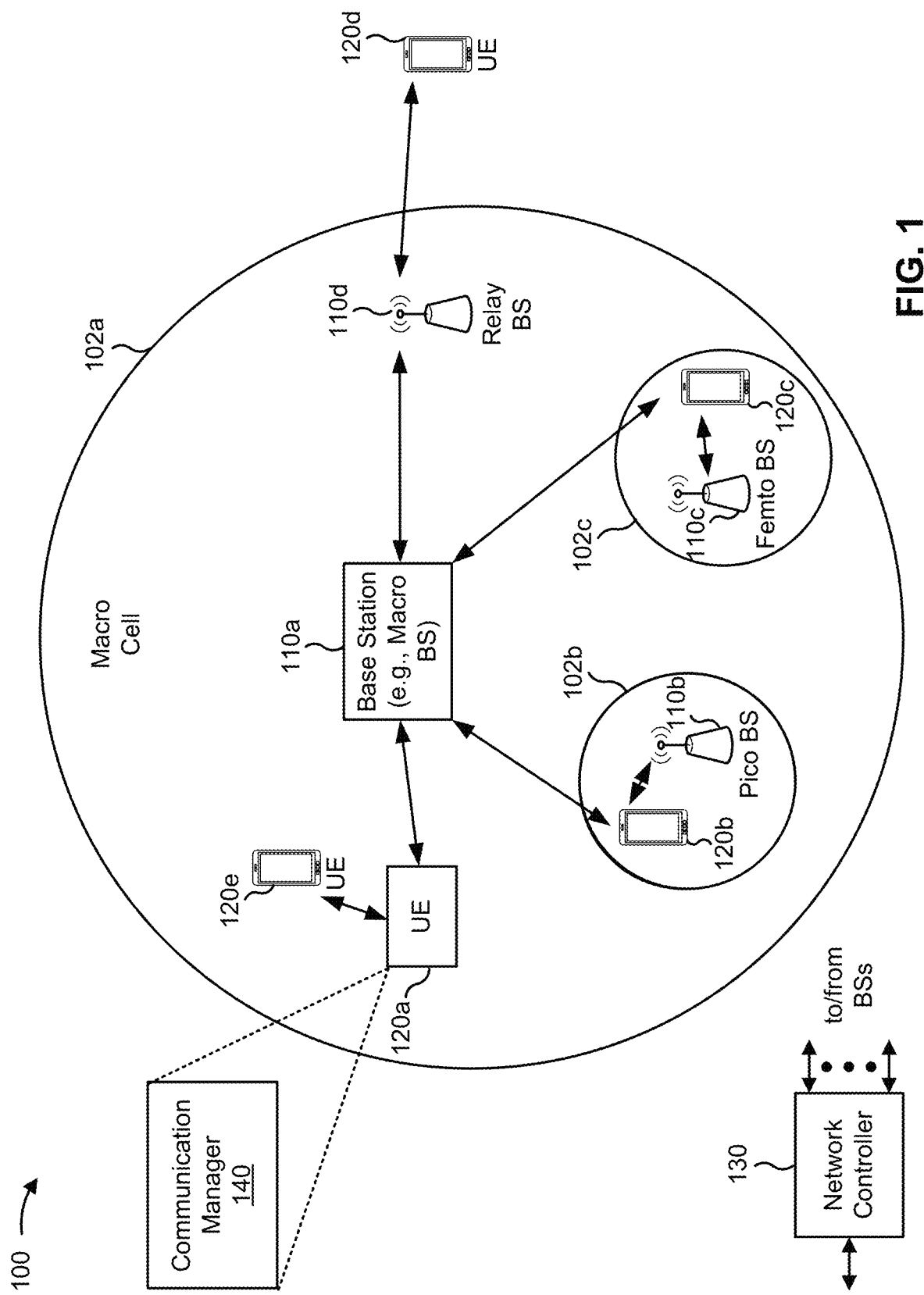
FIG. 1 is a diagram illustrating an example of a wireless network, in accordance with the present disclosure.

Some aspects described herein relate to a method of wireless communication performed by a user equipment (UE). The method may include precoding a physical sidelink control channel (PSCCH) communication using a first delay-Doppler precoder. The method may include precoding a physical sidelink shared channel (PSSCH) communication using one or more second delay-Doppler precoders. The method may include transmitting the PSCCH communication and the PSSCH communication in a slot after precoding the PSCCH communication and the PSSCH communication.

Some aspects described herein relate to a method of wireless communication performed by a UE. The method may include receiving a PSCCH communication and a PSSCH communication in a slot. The method may include decoding the PSCCH communication using a first delay-Doppler decoder. The method may include decoding the PSSCH communication using one or more second delay-Doppler decoders.

Some aspects described herein relate to a UE for wireless communication. The user equipment may include a memory and one or more processors coupled to the memory. The one or more processors may be configured to precode a PSCCH communication using a first delay-Doppler precoder. The one or more processors may be configured to precode a PSSCH communication using one or more second delay-Doppler precoders. The one or more processors may be configured to transmit the PSCCH communication and the PSSCH communication in a slot after precoding the PSCCH communication and the PSSCH communication.

Some aspects described herein relate to a UE for wireless communication. The UE may include a memory and one or more processors coupled to the memory. The one or more processors may be configured to receive a PSCCH communication and a PSSCH communication in a slot. The one or more processors may be configured to decode the PSCCH communication using a first delay-Doppler decoder. The one or more processors may be configured to decode the PSSCH communication using one or more second delay-Doppler decoders.

Some aspects described herein relate to a non-transitory computer-readable medium that stores a set of instructions for wireless communication by a UE. The set of instructions, when executed by one or more processors of the UE, may cause the UE to precode a PSCCH communication using a first delay-Doppler precoder. The set of instructions, when executed by one or more processors of the UE, may cause the UE to precode a PSSCH communication using one or more second delay-Doppler precoders. The set of instructions, when executed by one or more processors of the UE, may cause the UE to transmit the PSCCH communication and the PSSCH communication in a slot after precoding the PSCCH communication and the PSSCH communication.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to receive a PSCCH communication and a PSSCH communication in a slot. The set of instructions, when executed by one or more processors of the one or more instructions that, when executed by one or more processors of a UE, may cause the one or more instructions that, when executed by one or more processors of a UE to decode the PSCCH communication using a first delay-Doppler decoder. The set of instructions, when executed by one or more processors of the one or more instructions that, when executed by one or more processors of a UE, may cause the one or more instructions that, when executed by one or more processors of a UE to decode the PSSCH communication using one or more second delay-Doppler decoders.

Some aspects described herein relate to an apparatus for wireless communication. The apparatus may include means for precoding a PSCCH communication using a first delay-Doppler precoder. The apparatus may include means for precoding a PSSCH communication using one or more second delay-Doppler precoders. The apparatus may include means for transmitting the PSCCH communication and the PSSCH communication in a slot after precoding the PSCCH communication and the PSSCH communication.

Some aspects described herein relate to an apparatus for wireless communication. The apparatus may include means for receiving a PSCCH communication and a PSSCH communication in a slot. The apparatus may include means for decoding the PSCCH communication using a first delay-Doppler decoder. The apparatus may include means for decoding the PSSCH communication using one or more second delay-Doppler decoders.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may precode a physical sidelink control channel (PSCCH) communication using a first delay-Doppler precoder; precode a physical sidelink shared channel (PSSCH) communication using one or more second delay-Doppler precoders; and transmit the PSCCH communication and the PSSCH communication in a slot after precoding the PSCCH communication and the PSSCH communication. Additionally, or alternatively, the communication manager 140 may perform one or more other operations described herein.

In some aspects, the UE 120 may include a communication manager 140. As described in more detail elsewhere herein, the communication manager 140 may receive a PSCCH communication and a PSSCH communication in a slot; decode the PSCCH communication using a first delay-Doppler decoder; and decode the PSSCH communication using one or more second delay-Doppler decoders. Additionally, or alternatively, the communication manager 140 may perform one or more other operations described herein.

As indicated above, FIG. 1 is provided as an example. Other examples may differ from what is described with regard to FIG. 1.

Figure 2:
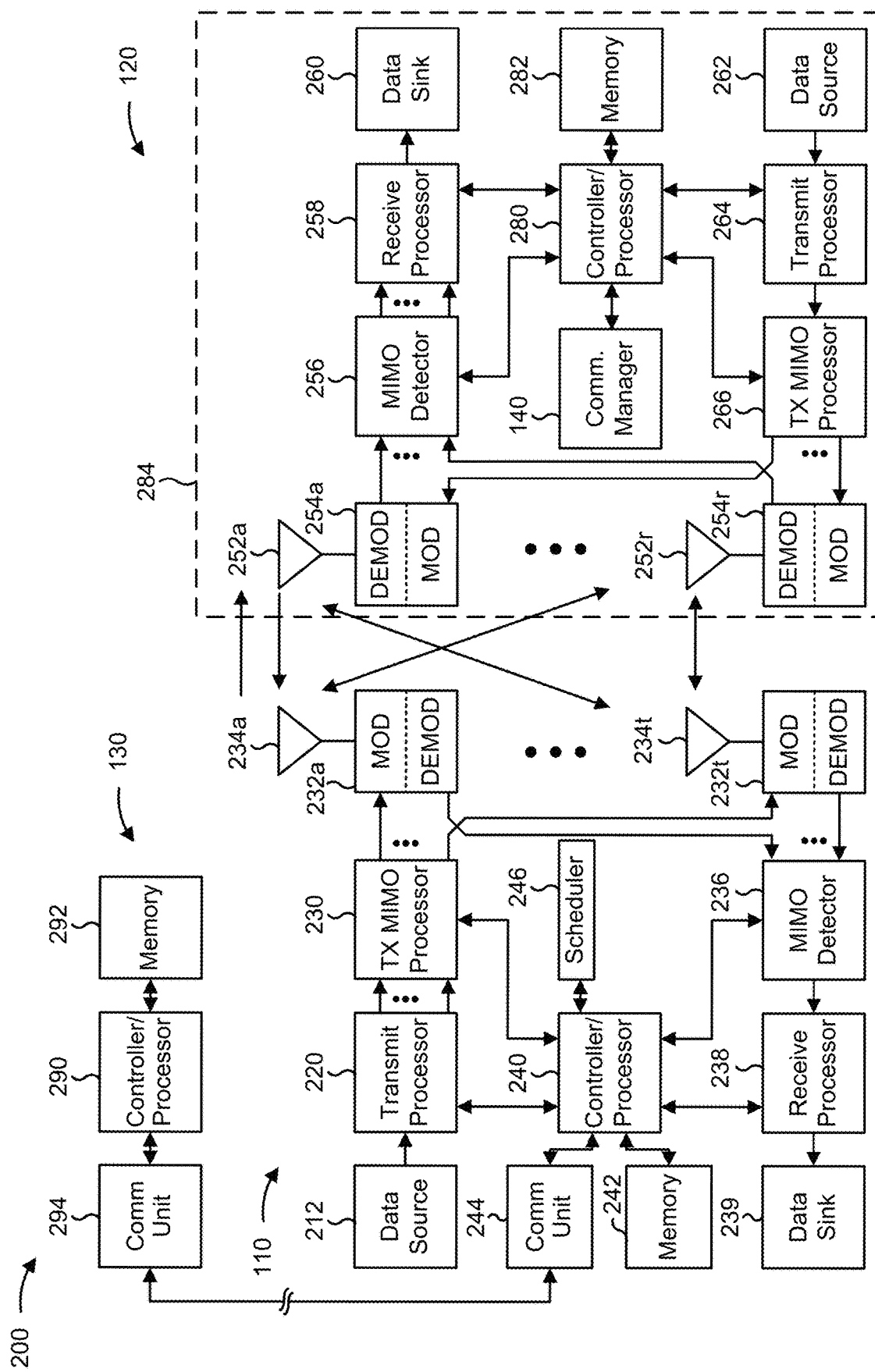
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for orthogonal frequency division multiplexing (OFDM)) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-16).

The controller/processor 240 of the base station 110, the controller/processor 280 of the UE 120, and/or any other component(s) of FIG. 2 may perform one or more techniques associated with OTFS precoding of control channel and shared channel communications, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE 120 includes means for precoding a PSCCH communication using a first delay-Doppler precoder; means for precoding a PSSCH communication using one or more second delay-Doppler precoders; and/or means for transmitting the PSCCH communication and the PSSCH communication in a slot after precoding the PSCCH communication and the PSSCH communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE 120 includes means for receiving a PSCCH communication and a PSSCH communication in a slot; means for decoding the PSCCH communication using a first delay-Doppler decoder; and/or means for decoding the PSSCH communication using one or more second delay-Doppler decoders. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
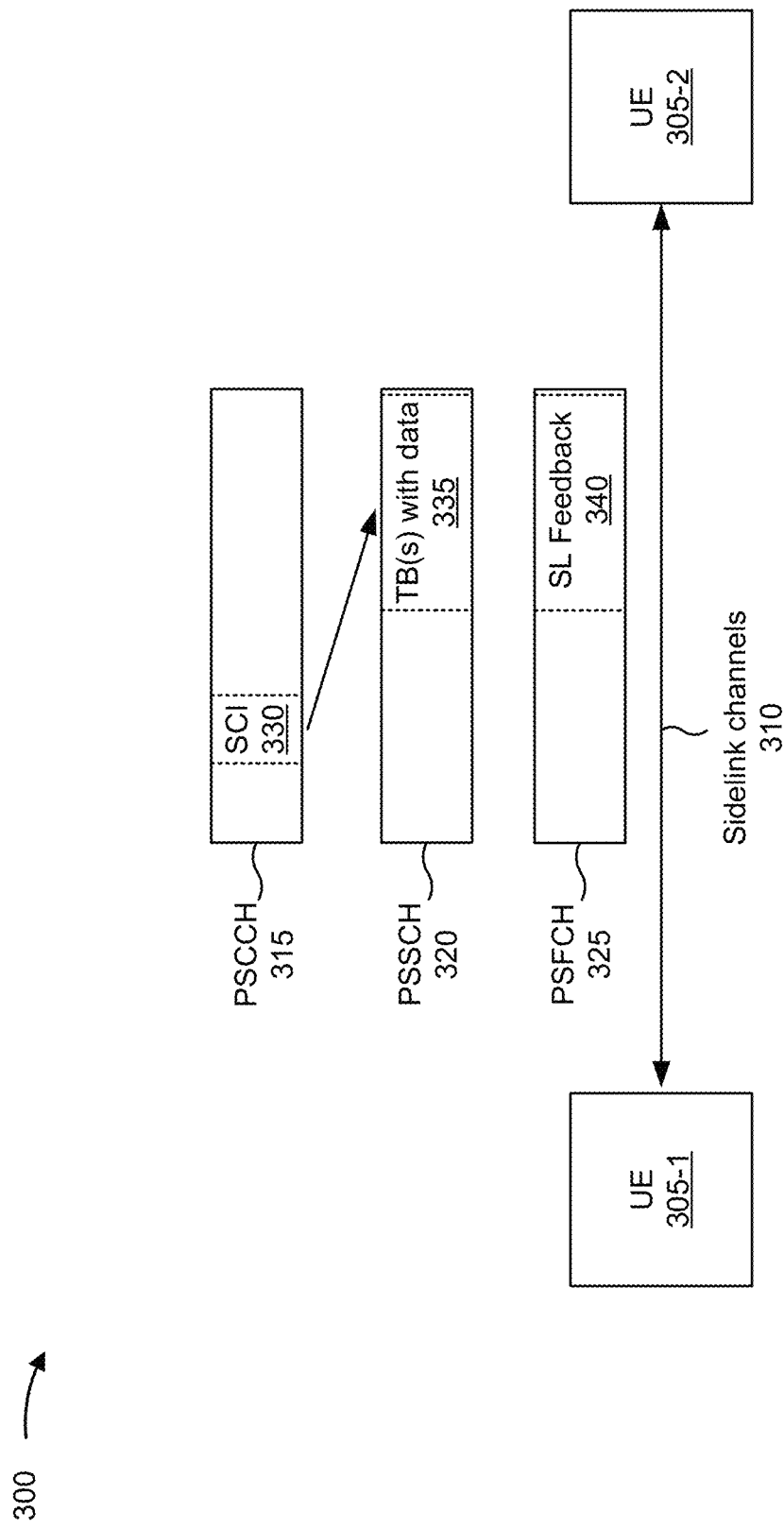
FIGS. 3 and 4 are diagrams illustrating examples of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a PSCCH 315, a PSSCH 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include information for detecting and/or decoding the PSSCH 320. For example, the SCI-2 may include an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
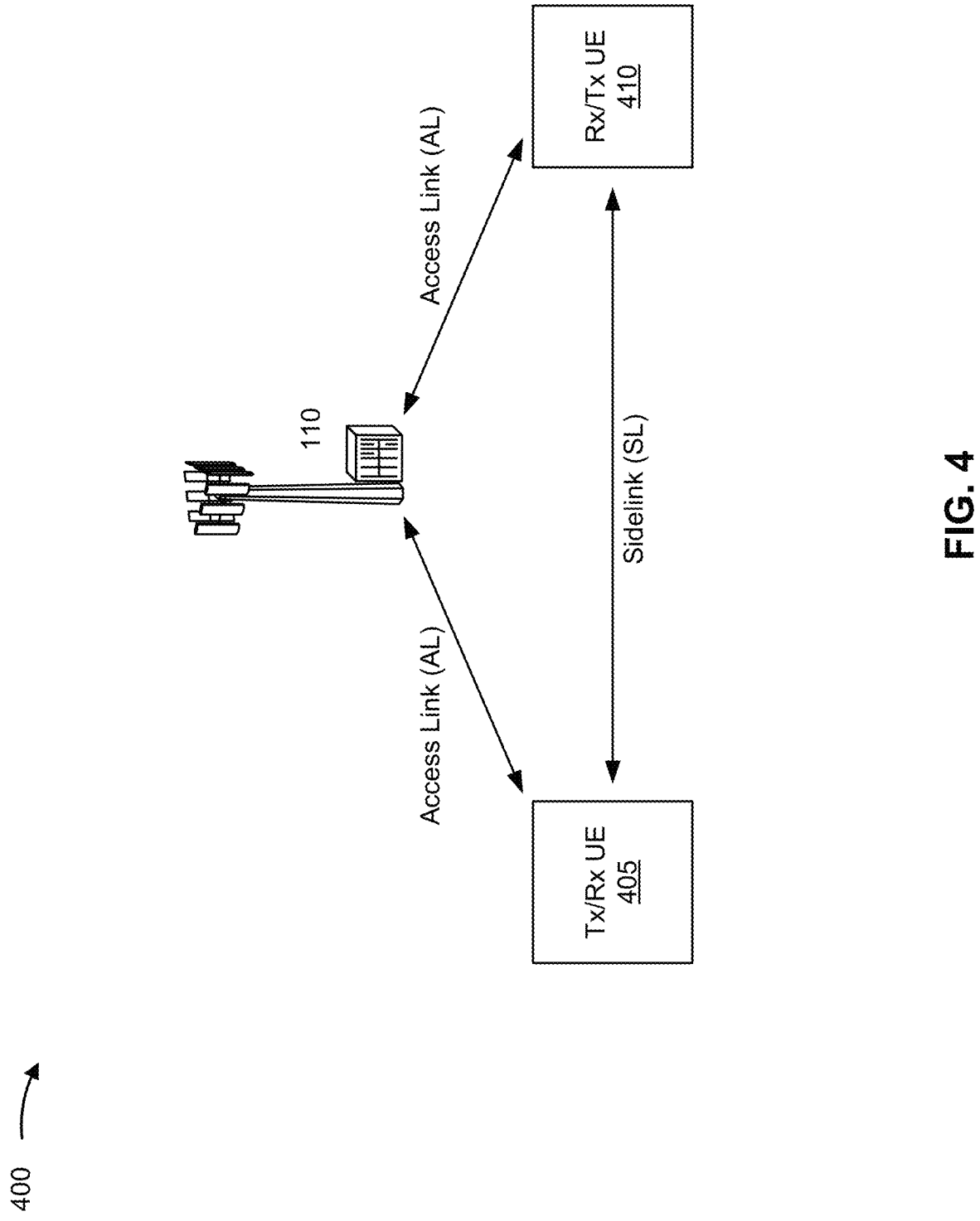

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
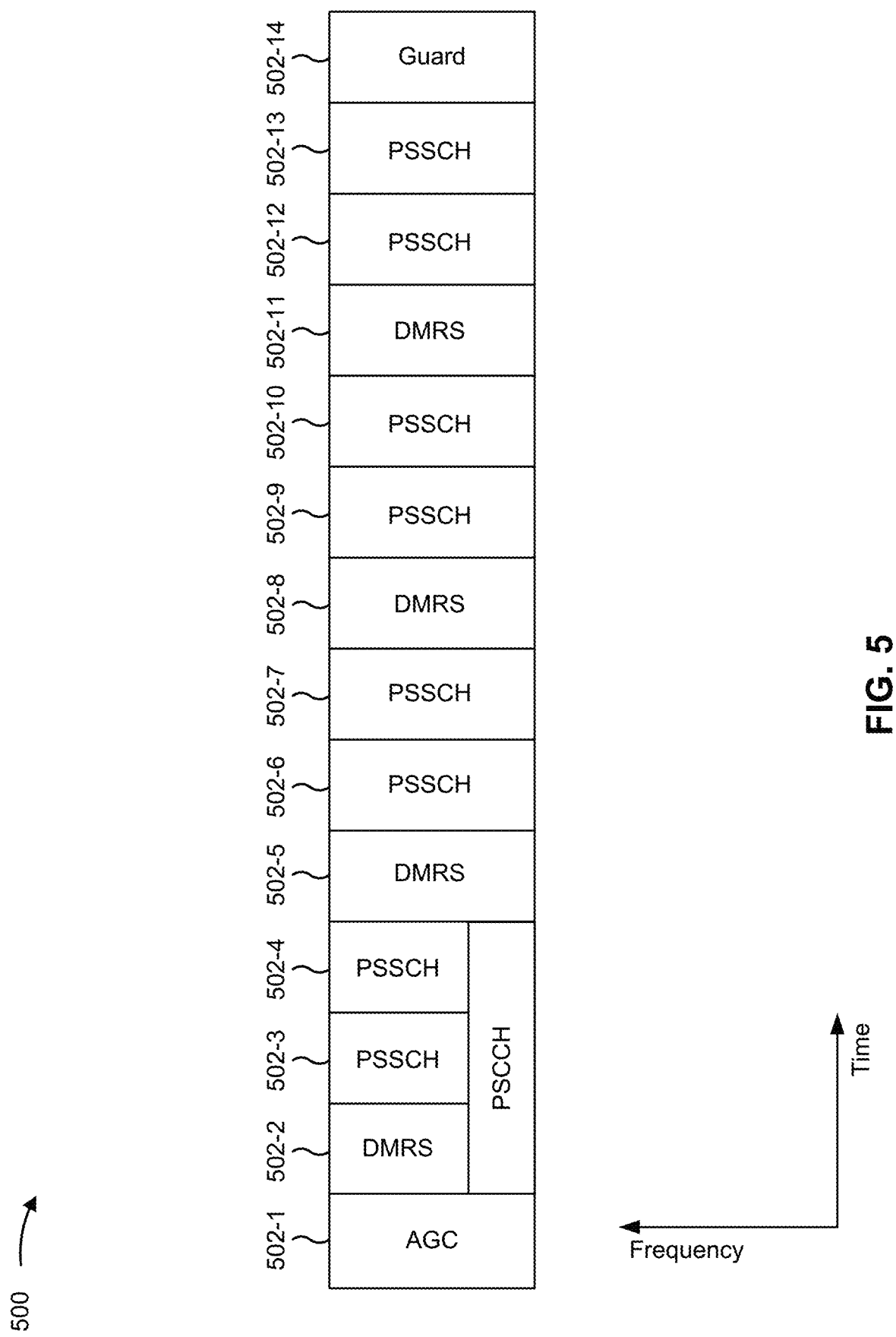
FIG. 5 is a diagram illustrating an example slot configuration, in accordance with the present disclosure.

FIG. 5 is a diagram of an example configuration of a slot 500, in accordance with the present disclosure. The example configuration includes an example of a configuration for a sidelink slot that may be used in sidelink communication. However, other slot configurations are within the scope of the present disclosure.

As shown in FIG. 5, the slot 500 includes a plurality of time domain resources, including symbols 502-1 through 502-14 (e.g., sidelink symbols). While the slot 500 includes 14 symbols in the example of FIG. 5, other quantities of symbols are within the scope of the present disclosure. The symbols 502-1 through 502-14 may include OFDM symbols, time-domain symbols, and/or another type of symbols. The slot 500 may also include one or more frequency domain resources, such as one or more sub-channels, one or more sub-carriers, one or more resource blocks, and/or one or more other types of frequency domain resources.

As further shown in FIG. 5, one or more types of sidelink communications may be configured for transmission and/or reception in the slot 500. The one or more types of sidelink communications may include a reference signal (e.g., a DMRS and/or another type of reference signal), a shared channel communication (e.g., a physical sidelink shared channel (PSSCH) communication), a control channel communication (e.g., a physical sidelink control channel (PSCCH) communication), and/or another type of sidelink communication. PSCCH communication(s) in the slot 500 may include SCI-1 as described above. The PSSCH communication(s) may include SCI-2 as described above and/or a data (e.g., shared channel data).

In some aspects, the slot 500 includes one or more guard symbols at the beginning of the slot 500, the end of the slot 500, and/or in another location in the slot 500. The guard symbol(s) may be configured to reduce overlap (and thus, interference and/or collisions) of sidelink transmissions in adjacent slots 500.

In some aspects, the slot 500 includes an automatic gain control (AGC) symbol at the beginning of the slot 500. The AGC symbol includes a copy or repetition of the first sidelink communication that is to be transmitted in the slot 500. For example, the AGC symbol in symbol 502-1 at the beginning of the slot 500 may include a copy or repetition of the DMRS transmission in the slot 502-2. In this way, a UE 120 that is to receive the DMRS transmission may use the copy or repetition of the DMRS transmission in the AGC symbol for automatic gain control. For example, the UE 120 may increase a receive gain, decrease a receive gain, and/or adjust another reception parameter based at least in part on the DMRS transmission in the AGC symbol. This enables the UE 120 to increase the likelihood of reception of sidelink transmissions in the slot 500 and to reduce the likelihood of dropped sidelink transmissions in the slot 500.

As further shown in FIG. 5, in some cases, one or more types of sidelink communications in the slot 500 may be frequency multiplexed (e.g., frequency division multiplexed). In the example shown in FIG. 5, a PSCCH communication is frequency multiplexed with a DMRS transmission in the symbol 502-2, the PSCCH communication is frequency multiplexed with a PSSCH communication in the symbol 502-3, and the PSCCH communication is frequency multiplexed with a PSSCH communication in the symbol 502-4 (the same PSSCH communication as in the symbol 502-3 or a different PSSCH communication). However, other frequency multiplexing configurations are within the scope of the present disclosure.

As indicated above, FIG. 5 is provided as an example. Other examples may differ from what is described with respect to FIG. 5.

In some cases, OFDM modulation and demodulation of sidelink communications (e.g., PSCCH communication, PSSCH communications) may be susceptible to high residual frequency offset and/or large Doppler spread. These issues can occur, for example, in high-Doppler environments such as V2X communications, high-speed vehicle communications, sidelink communications in the context of mmWave, and/or other high-mobility sidelink communication environments in which channel conditions rapidly change. Frequency offset and/or large Doppler spread may result in inter-carrier interference (ICI) (e.g., power leakage among sub-carriers) for sidelink communications in which OFDM modulation and demodulation is used. A wireless channel may function as a linear time-variant channel in a high-mobility sidelink communication environment as opposed to a linear time-invariant channel that is assumed for OFDM modulation and demodulation. As a result, frequency dispersion and/or time dispersion in a high-mobility sidelink communication environment, resulting from high residual frequency offset and/or large Doppler spread, can result in a break-down in orthogonality in OFDM modulation and demodulation, which causes increased ICI. Increased ICI may cause a decrease in robustness of sidelink communications, an increase in dropped or undecodable sidelink communications, and/or increase in sidelink retransmissions, among other examples. An increase in sidelink retransmissions may result in increased consumption of processing, memory, and/or sidelink radio resources for UEs that communicate on a sidelink.

Some aspects described herein include OTFS precoding and decoding of sidelink communication for mitigating and/or reducing the effects of high residual frequency offset and/or large Doppler shift that can occur in high-mobility sidelink communication environments and/or other sidelink communication environments. UEs (e.g., UEs 120) that communicate on a sidelink may use OTFS precoding and decoding to transmit information symbols in a sidelink communication in a delay-Doppler domain. In particular, a transmitter UE may precode the information symbols by transforming the information symbols from the delay-Doppler domain to the time-frequency domain. Then, the transmitter UE may modulate the information symbols using OFDM to further transform the information symbols from the time-frequency domain to the time domain for transmission over a wireless sidelink channel. A receiver UE may receive the information symbols and may perform reverse operations to demodulate and decode the information symbols.

OTFS precoding and decoding of sidelink communications may provide constant fading and multi-path diversity, as well as sparse and stable channel occupation, which enables joint time-frequency diversity for sidelink communications. OTFS precoding and decoding may also enable reduced peak-to-average power ratios (PAPRs), greater power transmission efficiency, and/or reduced cyclic prefix overhead, among other examples.

Some aspects described herein include OTFS precoding of PSCCH communications and PSSCH communications using a plurality of delay-Doppler precoders. As an example, a PSSCH communication may be precoded using a first delay-Doppler precoder, and a PSSCH communication may be precoded using one or more second delay-Doppler precoders. The use of a plurality of precoders enables a receiver UE to decode the PSCCH communication faster than if the PSCCH communication and the PSSCH communication were decoded together using the same delay-Doppler precoder. This enables the receiver UE to more quickly decode SCI-1 and to more quickly identify the location (e.g., the time domain resources and/or the frequency domain resources) of SCI-2 included in the PSSCH communication. Moreover, the SCI-2 may be precoded using a different delay-Doppler precoder than the data of the PSSCH communication (or with a portion of the data), which enables the receiver UE to more quickly decode the SCI-2. This enables the receiver UE to more quickly identify the location of the data of the PSSCH communication and/or to more quickly determine whether the data of the PSSCH communication is directed to the receiver UE. In this way, if the receiver UE determines that the data of the PSSCH communication is not directed to the receiver UE, the receiver UE may refrain from decoding the data of the PSSCH communication, which conserves processing and memory resources of the receiver UE.

Figure 6A:
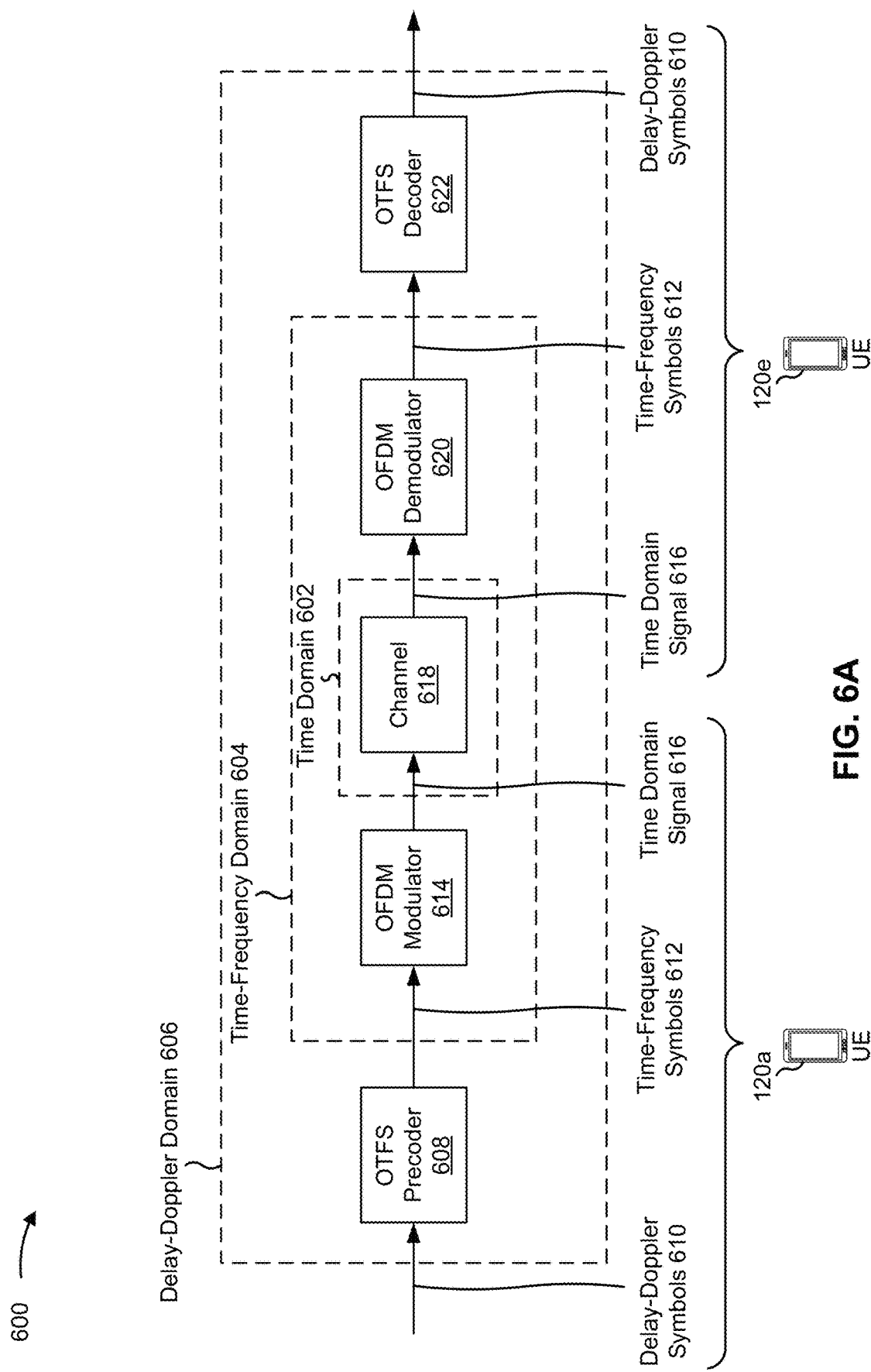
FIGS. 6A and 6B are diagrams illustrating examples associated with orthogonal time frequency space (OTFS) based communication, in accordance with the present disclosure.
Figure 6B:
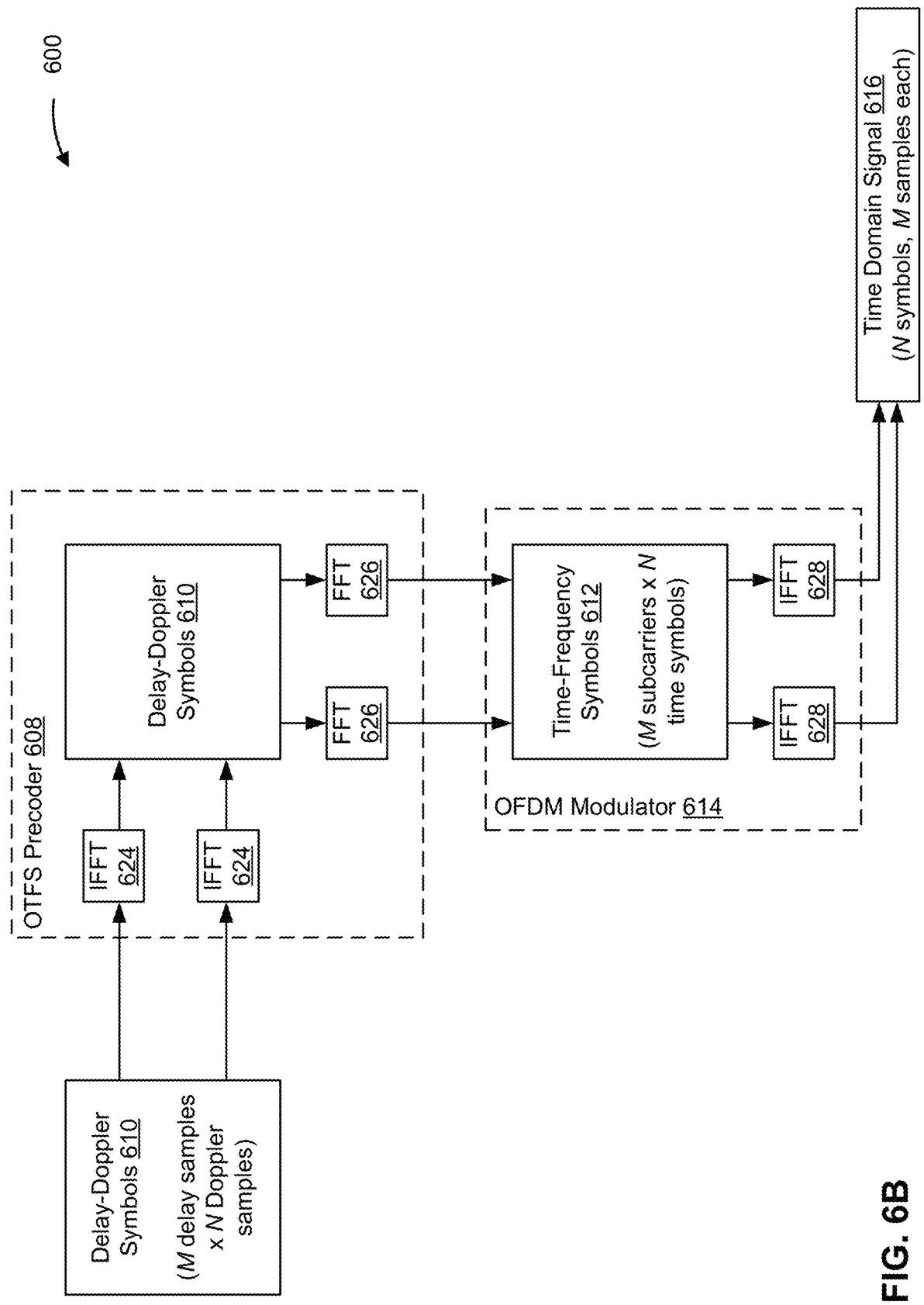

FIGS. 6A and 6B are diagrams of an example 600 of OTFS-based communication, in accordance with the present disclosure. The example 600 includes communication (e.g., sidelink communication) between a UE 120a and a UE 120e. The UE 120a may be referred to as a transmitter UE in that the UE 120a transmits a sidelink communication to the UE 120e. The UE 120e may be referred to as a receiver UE in that the UE 120e receives the sidelink communication from the UE 120a.

As shown in FIG. 6A, communication between the UE 120a and the UE 120e may be performed in the time domain 602. A sidelink communication that is to be transmitted by the UE 120a to the UE 120e may be converted or transformed to the time domain 602 from one or more other domains, such as a time-frequency domain 604 and a delay-Doppler domain 606.

As further shown in FIG. 6A, the UE 120a may include an OTFS precoder 608. The OTFS precoder 608 receives a plurality of delay-Doppler symbols 610 of the sidelink communication and converts the delay-Doppler symbols 610 from the delay-Doppler domain 606 to the time-frequency domain 604. In particular, the OTFS precoder 608 converts or transforms the delay-Doppler symbols 610 to time-frequency symbols 612. The delay-Doppler symbols 610 include a block of M×N delay-Doppler quadrature amplitude modulated (QAM) symbols that are discretized to an M by N delay-Doppler plane that includes M delay samples and N Doppler shift samples. The time-frequency symbols 612 include a block of M×N OFDM modulated symbols that are spread across M subcarriers and N time symbols.

As further shown in FIG. 6A, the UE 120a may include an OFDM modulator 614. The OFDM modulator 614 converts or transforms the time-frequency symbols 612 from the time-frequency domain 604 to the time domain 602. In particular, the OFDM modulator 614 modulates the time-frequency symbols 612 using an OFDM technique to generate a time domain signal 616 that includes the information of the sidelink communication. The time domain signal 616 includes a time-varying signal that includes N symbols, each including M samples. The UE 120a transmits the time domain signal 616 over a channel 618 (e.g., a wireless sidelink channel) as the sidelink communication.

The UE 120e receives the time domain signal 616 over the channel 618 from the UE 120a. The UE 120e may include an OFDM demodulator 620 that converts or transforms the time domain signal 616 from the time domain 602 to the time-frequency domain 604. In particular, the OFDM demodulator 620 demodulates the time domain signal 616 using an OFDM technique to convert or transform the time domain signal 616 to the time-frequency symbols 612. The UE 120e further includes an OTFS decoder 622. The OTFS decoder 622 may convert or transform the time-frequency symbols 612 from the time-frequency domain 604 to the delay-Doppler domain 606. In particular, the OTFS decoder 622 may decode the time-frequency symbols 612 to obtain the delay-Doppler symbols 610.

As shown in FIG. 6B, the OTFS precoder 608 may apply or use a two-dimensional finite Fourier transform (FFT), referred to as an inverse symplectic FFT (ISFFT), to convert the delay-Doppler symbols 610 to the time-frequency symbols 612. However, other two-dimensional transforms may be used for OTSF precoding to transform or convert the delay-Doppler symbols 610 to the time-frequency symbols 612.

An ISFFT is a two-dimensional transform that includes an inverse FFT (IFFT) 624 and an FFT 626, where the IFFT 624 is applied in one dimension of a delay-Doppler matrix and the FFT 626 is applied in a second dimension of the delay-Doppler matrix. The OTFS precoder 608 uses the IFFT 624 on the M delay samples of the delay-Doppler symbols 610 and uses the FFT 626 on the N Doppler samples of the delay-Doppler symbols 610 to generate the time-frequency symbols 612. The time-frequency symbols 612 are provided to the OFDM modulator 614. The OFDM modulator 614 includes an IFFT 628 that is used to modulate the time-frequency symbols 612 to generate the time domain signal 616. Note that while the example in FIG. 6B illustrates the M delay samples of the delay-Doppler symbols 610 are mapped first and the N Doppler samples of the delay-Doppler symbols 610 are mapped second, the N Doppler samples of the delay-Doppler symbols 610 may be mapped first and the M delay samples of the delay-Doppler symbols 610 may be mapped second. The order has little to no effect on the precoding performance due to the joint detection in OTFS and constant delay-Doppler channel throughout OTFS. The mapping order can be configured at the UE 120e, can be defined in a wireless communication standard or specification (e.g., a 3 GPP specification), and/or negotiated among sidelink UEs, among other examples.

The OFDM demodulator 620 and the OTFS decoder 622 of the UE 120e may perform reverse operations of those shown in FIG. 6B to demodulate and decode the sidelink communication. However, the OTFS decoder 622 uses a symplectic FFT (SFFT) (instead of an ISFFT) to convert the time-frequency symbols 612 to the delay-Doppler symbols 610. The SFFT includes a two-dimensional transform similar to the ISFFT, but a non-inverse version. In some aspects, the OTFS decoder 622 uses another type of two-dimensional transform to convert the time-frequency symbols 612 to the delay-Doppler symbols 610.

As indicated above, FIGS. 6A and 6B are provided as examples. Other examples may differ from what is described with respect to FIGS. 6A and 6B.

Figure 7:
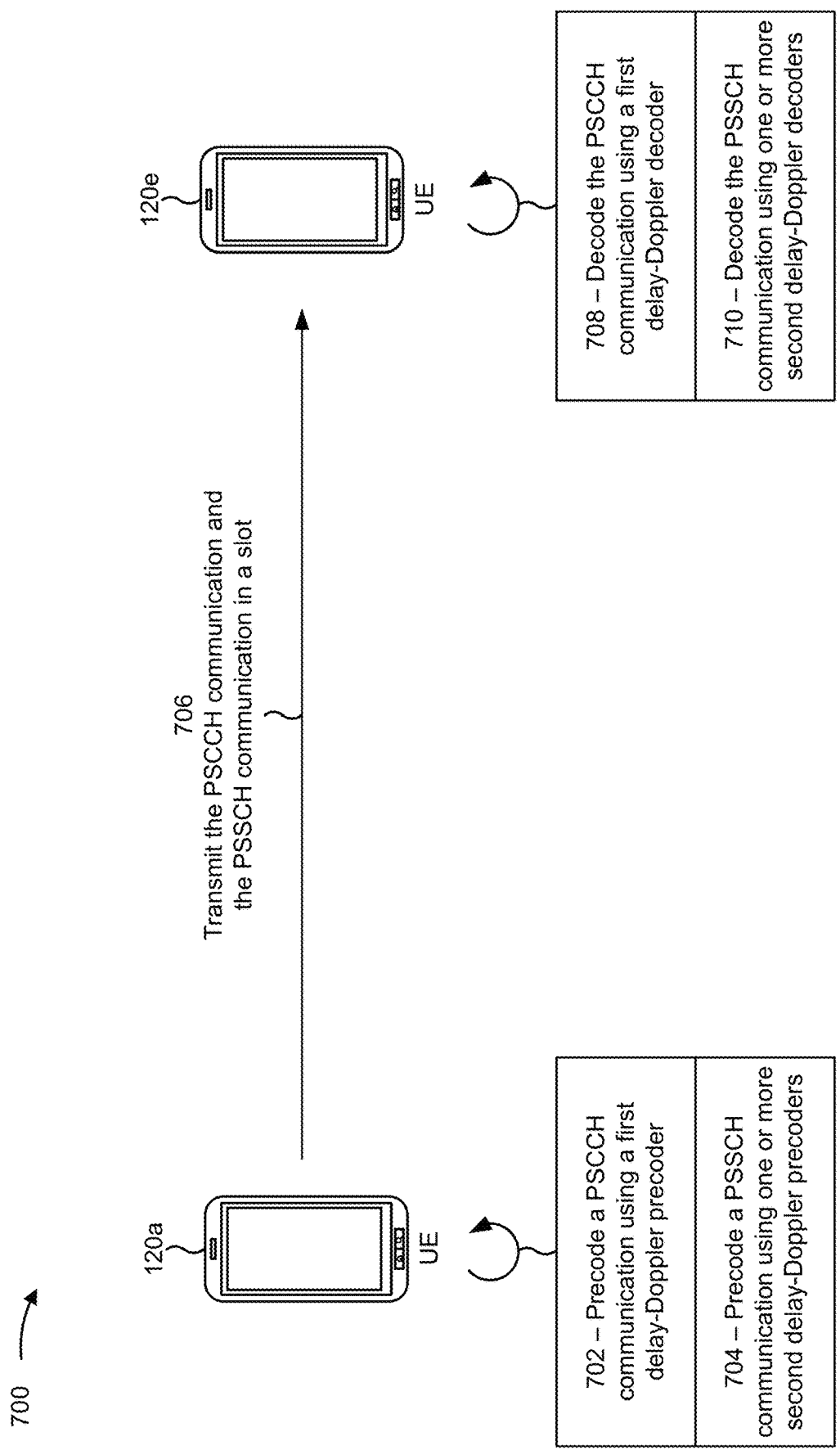

FIG. 7 is a diagram illustrating an example 700 of OTFS precoding and decoding of control channel and shared channel communications, in accordance with the present disclosure. In particular, the example 700 includes an example of OTFS precoding and decoding of sidelink control channel and sidelink shared channel communications between the UE 120a and the UE 120e. However, the techniques described herein may be used for access link communications, including downlink communications from a base station 110 to a UE 120 and uplink communications from a UE 120 to a base station 110.

The UE 120a may be scheduled or configured to transmit a PSCCH communication and an associated PSSCH communication to the UE 120e. The UE 120a may be scheduled or configured to transmit a PSCCH communication and an associated PSSCH communication in a slot, such as a slot 500 or another sidelink slot having a different configuration. The PSCCH communication may include SCI-1 and/or other control information. The PSSCH communication may include SCI-2 and/or data. In some aspects, the UE 120a transmits one or more other types of sidelink communications to the UE 120e in the slot, such as a reference signal (e.g., a DMRS) and/or an AGC transmission, among other examples.

In some aspects, the UE 120a configures the PSCCH communication such that the SCI-1 explicitly and/or implicitly indicates the location of the SCI-2 of the PSSCH communication. For example, the UE 120a may configure the PSCCH communication such that the SCI-1 explicitly indicates the time domain resources and/or the frequency domain resources in which the SCI-2 is transmitted. The UE 120e may determine the time domain resources and/or the frequency domain resources in which the SCI-2 is transmitted based at least in part on the explicit indication in the SCI-1. As another example, the UE 120e may determine the time domain resources and/or the frequency domain resources in which the SCI-2 is transmitted based at least in part on a quantity of total resources allocated for the SCI-2 and a quantity of total resources that are frequency multiplexed with the PSCCH communication in the slot (e.g., as described in connection with FIGS. 8-11). The UE 120e may determine the location of the data of the PSSCH communication based at least in part on the SCI-2.

As shown in FIG. 7, and by reference number 702, the UE 120a may precode the PSCCH communication using a first delay-Doppler precoder, such as a first ISFFT or another type of two-dimensional transform. The UE 120a may precode the PSCCH communication using the first delay-Doppler precoder to convert or transform delay-Doppler symbols 610 of the PSCCH communication from the delay-Doppler domain 606 to the time-frequency domain 604. In other words, the OTFS precoder 608 of the UE 120a may convert or transform delay-Doppler symbols 610 of the PSCCH communication to time-frequency symbols 612. In some aspects, the UE 120a precodes a DMRS along with the PSCCH communication using the first delay-Doppler precoder. In some aspects, the Doppler dimension of the first delay-Doppler precoder (e.g., the value for N) for the PSCCH communication may be based at least in part on the quantity of delay-Doppler symbols 610 of the PSCCH communication. For example, the Doppler dimension may be 2, 3, or another value.

As further shown in FIG. 7, and by reference number 704, the UE 120a may precode the PSSCH communication using one or more second delay-Doppler precoders, such as one or more second ISFFTs or another type of two-dimensional transform. The UE 120a may precode the PSSCH communication using the second delay-Doppler precoder to convert or transform delay-Doppler symbols 610 of the PSSCH communication from the delay-Doppler domain 606 to the time-frequency domain 604. In other words, the OTFS precoder 608 of the UE 120a may convert or transform delay-Doppler symbols 610 of the PSSCH communication to time-frequency symbols 612. The Doppler dimension of the one or more second delay-Doppler precoders may be based at least in part on the quantity of time domain resources and/or the quantity of frequency domain resources allocated to the SCI-2 of the PSCCH communication.

The one or more second delay-Doppler precoders and the first delay-Doppler precoder are different delay-Doppler precoders. As described above, the use of different delay-Doppler precoders (e.g., different ISFFTs) for the PSCCH communication, and the PSSCH communication enables a receiver UE (the UE 120e) to decode the PSCCH communication faster than if the PSCCH communication and the PSSCH communication were decoded together using the same delay-Doppler precoder (or same ISFFT). This enables the UE 120e to more quickly decode the SCI-1 and to more quickly identify the location (e.g., the time domain resources and/or the frequency domain resources) of the SCI-2 included in the PSSCH communication.

Moreover, the UE 120a may precode the SCI-2 of the PSSCH communication using a different delay-Doppler precoder (e.g., a different ISFFT) of the one or more second delay-Doppler precoder than the delay-Doppler precoder (e.g., the ISFFT) that is used to precode the data of the PSSCH communication, which enables the UE 120e to more quickly decode the SCI-2. This enables the UE 120e to more quickly identify the location of the data of the PSSCH communication and/or to more quickly determine whether the data of the PSSCH communication is directed to the UE 120e. In some aspects, the UE 120a precodes the SCI-2 using a third delay-Doppler precoder (e.g., a third ISFFT) of the one or more second delay-Doppler precoders, and precodes the data using a fourth delay-Doppler precoder (e.g., a fourth ISFFT) of the one or more second delay-Doppler precoders. In some aspects, the UE 120a precodes the SCI-2 and a portion of the data using a third delay-Doppler precoder (e.g., a third ISFFT) of the one or more second delay-Doppler precoders, and precodes a remaining portion of the data using a fourth delay-Doppler precoder (e.g., a fourth ISFFT) of the one or more second delay-Doppler precoders. In some aspects, the UE 120a precodes a first portion of the data and a second portion of the data using different delay-Doppler precoders (e.g., different ISFFTs). In some aspects, the UE 120a precodes a DMRS along with the SCI-2 and/or portion(s) of the data using the one or more second delay-Doppler precoder.

The UE 120a may determine the quantity of the one or more second delay-Doppler precoders and/or the configuration of the one or more second delay-Doppler precoders based at least in part on the time domain resources and/or the frequency domain resources associated with the SCI-2 of the PSSCH communication. For example, the UE 120a may determine whether to use a delay-Doppler precoder to precode SCI-2 only, whether to use a delay-Doppler precoder to precode SCI-2 with a portion of the data, and/or whether to use a delay-Doppler precoder to precode data only based at least in part on a quantity of total resources (e.g., time domain resources and/or frequency domain resources) in the slot for the SCI-2. Examples are described in connection with FIGS. 8-11.

As further shown in FIG. 7, and by reference number 706, the UE 120a may transmit (and the UE 120e may receive) the PSCCH communication and the PSSCH communication (e.g., over the channel 618) after the UE 120a precodes the PSCCH communication and the PSSCH communication. In some aspects, the UE 120a (e.g., using the OFDM modulator 614) modulates the time-frequency symbols 612 of the PSCCH communication and the time-frequency symbols 612 of the PSSCH communication to generate a time domain signal 616 for the PSCCH communication and the PSSCH communication. The UE 120a transmits the time domain signal 616 to the UE 120e to transmit the sidelink communication to the UE 120e.

As further shown in FIG. 7, and by reference number 708, the UE 120e may decode the PSCCH communication using a first SFFT. The UE 120e may decode the PSCCH communication using the first delay-Doppler decoder (e.g., a first SFFT) to convert or transform the time-frequency symbols 612 of the PSCCH communication from the time-frequency domain 604 to the delay-Doppler domain 606. In other words, the OTFS decoder 622 of the UE 120e may convert or transform the time-frequency symbols 612 of the PSCCH communication to delay-Doppler symbols 610. In some aspects, the UE 120e decodes a DMRS along with the PSCCH communication using the first delay-Doppler decoder.

As further shown in FIG. 7, and by reference number 710, the UE 120e may decode the PSSCH communication using one or more second delay-Doppler decoder (e.g., one or more second SFFTs). The UE 120e may decode the PSSCH communication using the one or more second delay-Doppler decoders to convert or transform the time-frequency symbols 612 of the PSSCH communication from the time-frequency domain 604 to the delay-Doppler domain 606. In other words, the OTFS decoder 622 of the UE 120e may convert or transform the time-frequency symbols 612 of the PSSCH communication to delay-Doppler symbols 610.

In some aspects, the UE 120e (e.g., using the OFDM demodulator 620) demodulates the time domain signal 616 to generate the time-frequency symbols 612 of the PSCCH communication and the time-frequency symbols 612 of the PSSCH communication prior to decoding the PSCCH communication and the PSSCH communication.

The one or more second delay-Doppler decoders and the first delay-Doppler decoder are different delay-Doppler decoders. As described above, the use of different delay-Doppler decoders (e.g., different SFFTs) for the PSCCH communication and the PSSCH communication enables the UE 120e to decode the PSCCH communication faster than if the PSCCH communication and the PSSCH communication were decoded together using the same delay-Doppler decoder (e.g., the same SFFT). This enables the UE 120e to more quickly decode the SCI-1 and to more quickly identify the location (e.g., the time domain resources and/or the frequency domain resources) of the SCI-2 included in the PSSCH communication.

Moreover, the UE 120e may decode the SCI-2 of the PSSCH communication using a different delay-Doppler decoder (e.g., a different SFFT) of the one or more second delay-Doppler decoders than the delay-Doppler decoder (e.g., the SFFT) that is used to decode the data of the PSSCH communication, which enables the UE 120e to more quickly decode the SCI-2. This enables the UE 120e to more quickly identify the location of the data of the PSSCH communication and/or to more quickly determine whether the data of the PSSCH communication is directed to the UE 120e. In this way, if the UE 120e determines that the data of the PSSCH communication is not directed to the UE 120e, the UE 120e may refrain from decoding the data of the PSSCH communication, which conserves processing and memory resources of the UE 120e.

In some aspects, the UE 120e decodes the SCI-2 using a third delay-Doppler decoder (e.g., a third SFFT) of the one or more second delay-Doppler decoders, and decodes the data using a fourth delay-Doppler decoder (e.g., a fourth SFFT) of the one or more second delay-Doppler decoders. In some aspects, the UE 120e decodes the SCI-2 and a portion of the data using a third delay-Doppler decoder (e.g., a third SFFT) of the one or more second delay-Doppler decoders, and decodes a remaining portion of the data using a fourth delay-Doppler decoder (e.g., a fourth SFFT) of the one or more delay-Doppler decoders. In some aspects, the UE 120e decodes a first portion of the data and a second portion of the data using different delay-Doppler decoders (e.g., different SFFTs). In some aspects, the UE 120e decodes a DMRS along with the SCI-2 and/or portion(s) of the data using the one or more second delay-Doppler decoders.

As indicated above, FIG. 7 is provided an examples. Other examples may differ from what is described with respect to FIG. 7.

Figure 8:
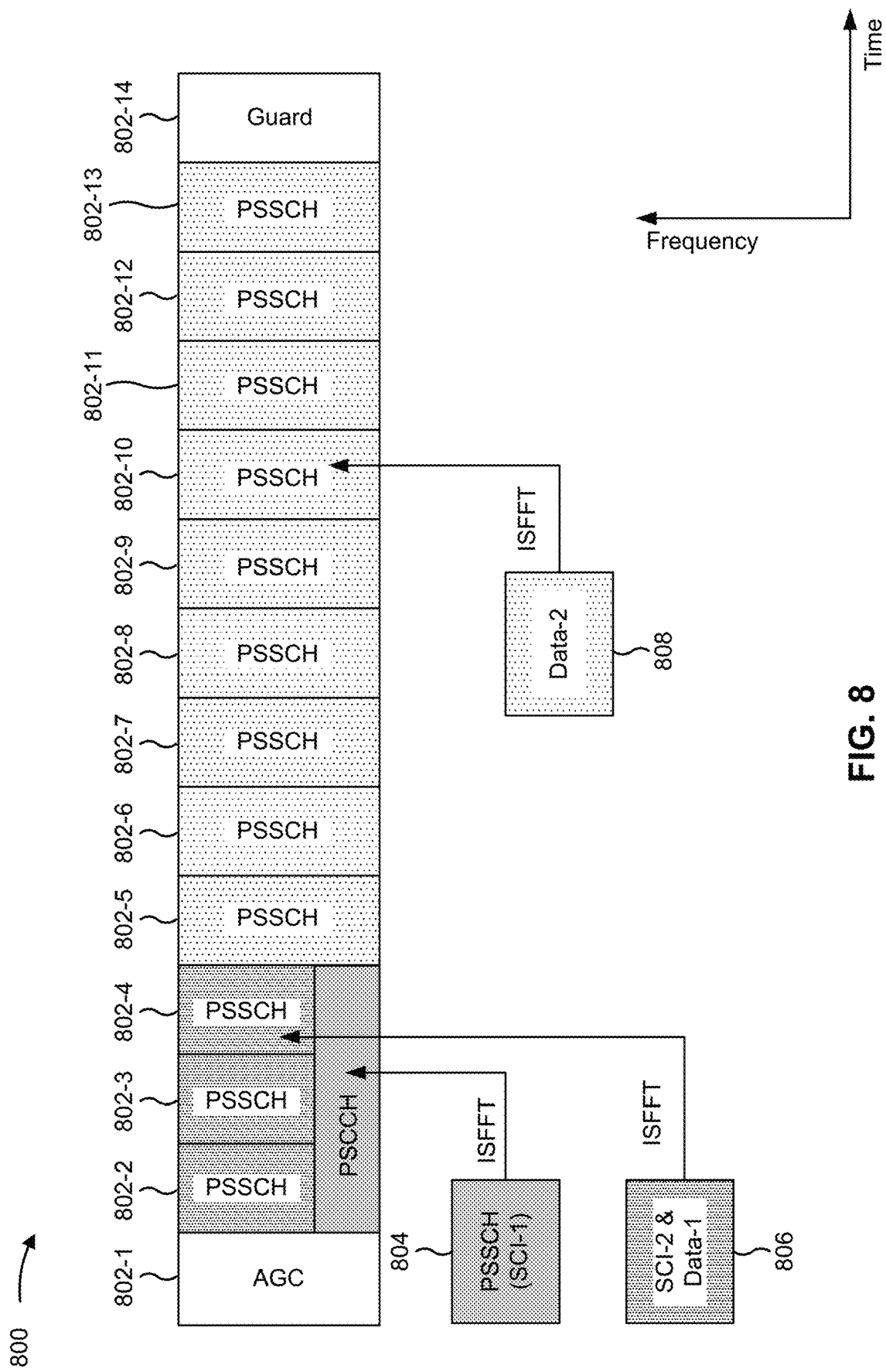

FIG. 8 is a diagram illustrating an example 800 of OTFS precoding and decoding of control channel and shared channel communications, in accordance with the present disclosure. In particular, the example 800 includes an example of OTFS precoding and decoding of sidelink control channel and sidelink shared channel communications between the UE 120a and the UE 120e. However, the techniques described herein may be used for access link communications, including downlink communications from a base station 110 to a UE 120 and uplink communications from a UE 120 to a base station 110.

The UE 120a may perform operations described above in connection with FIGS. 6A, 6B, and/or 7 to precode a PSCCH communication using a single ISFFT, and to precode a PSSCH communication using a plurality of ISFFTs. The UE 120a may transmit the PSCCH communication and the PSSCH communication in a slot after precoding the PSCCH communication and the PSSCH communication.

As shown in FIG. 8, the slot includes a plurality of symbols 802-1 through 802-14. However, the slot may include another quantity of symbols. The UE 120a may perform an AGC transmission in slot 802-1, may transmit the PSCCH communication in symbols 802-2 through 802-4, and may transmit the PSSCH communication in symbols 802-2 through 802-13. The PSCCH communication is frequency multiplexed with a portion of the PSSCH communication in the symbols 802-2 through 802-4.

As indicated above, the UE 120a may determine the quantity of ISFFTs, and the configuration for the ISFFTs, for precoding the PSSCH communication based at least in part on a quantity of total resources of the SCI-2 of the PSSCH communication. As shown in the example 800 in FIG. 8, the UE 120a determines that the quantity of total resources (e.g., a quantity of time domain resources and/or a quantity of frequency domain resources), in the slot, for the SCI-2 is less than or equal to a quantity of total resources (e.g., a quantity of time domain resources and/or a quantity of frequency domain resources) that are frequency multiplexed with the PSCCH communication in the slot.

Accordingly, the UE 120a may precode delay-Doppler symbols 804 of the PSCCH communication (which includes SCI-1) using a first ISFFT, may precode delay-Doppler symbols 806 of the SCI-2 and a first data portion of the PSSCH communication using a second ISFFT, and may precode delay-Doppler symbols 808 of a second data portion of the PSSCH communication using a third ISFFT. The first ISFFT, the second ISFFT, and the third ISFFT are different ISFFTs.

Similarly, the UE 120e may decode the delay-Doppler symbols 804 of the PSCCH communication using a first SFFT, may decode the delay-Doppler symbols 806 of the SCI-2 and the first data portion of the PSSCH communication using the second ISFFT, and may decode the delay-Doppler symbols 808 of the second data portion of the PSSCH communication using a third SFFT. The first SFFT, the second SFFT, and the third SFFT are different SFFTs.

The SCI-2 is multiplexed with the first data portion to match the total quantity of resources that are frequency multiplexed with the PSCCH communication in the slot. The SCI-2 and the first data portion are frequency multiplexed with the PSCCH communication in the slot, in symbols 802-2 through 802-4. Including the first data portion along with the SCI-2 reduces and/or eliminates unused resources in the slot which increases sidelink channel efficiency. The second data portion of the PSSCH communication is transmitted in symbols 802-5 through 802-13.

Alternatively, the UE 120a may precode the SCI-2 of the PSSCH communication using a separate ISFFT (e.g., without data from the PSSCH communication) if the quantity of total resources of the SCI-2 is equal to the total quantity of resources that are frequency multiplexed with the PSCCH communication in the slot, as resources that are frequency multiplexed with the PSCCH communication are not wasted in this case.

As indicated above, FIG. 8 is provided an examples. Other examples may differ from what is described with respect to FIG. 8.

Figure 9:
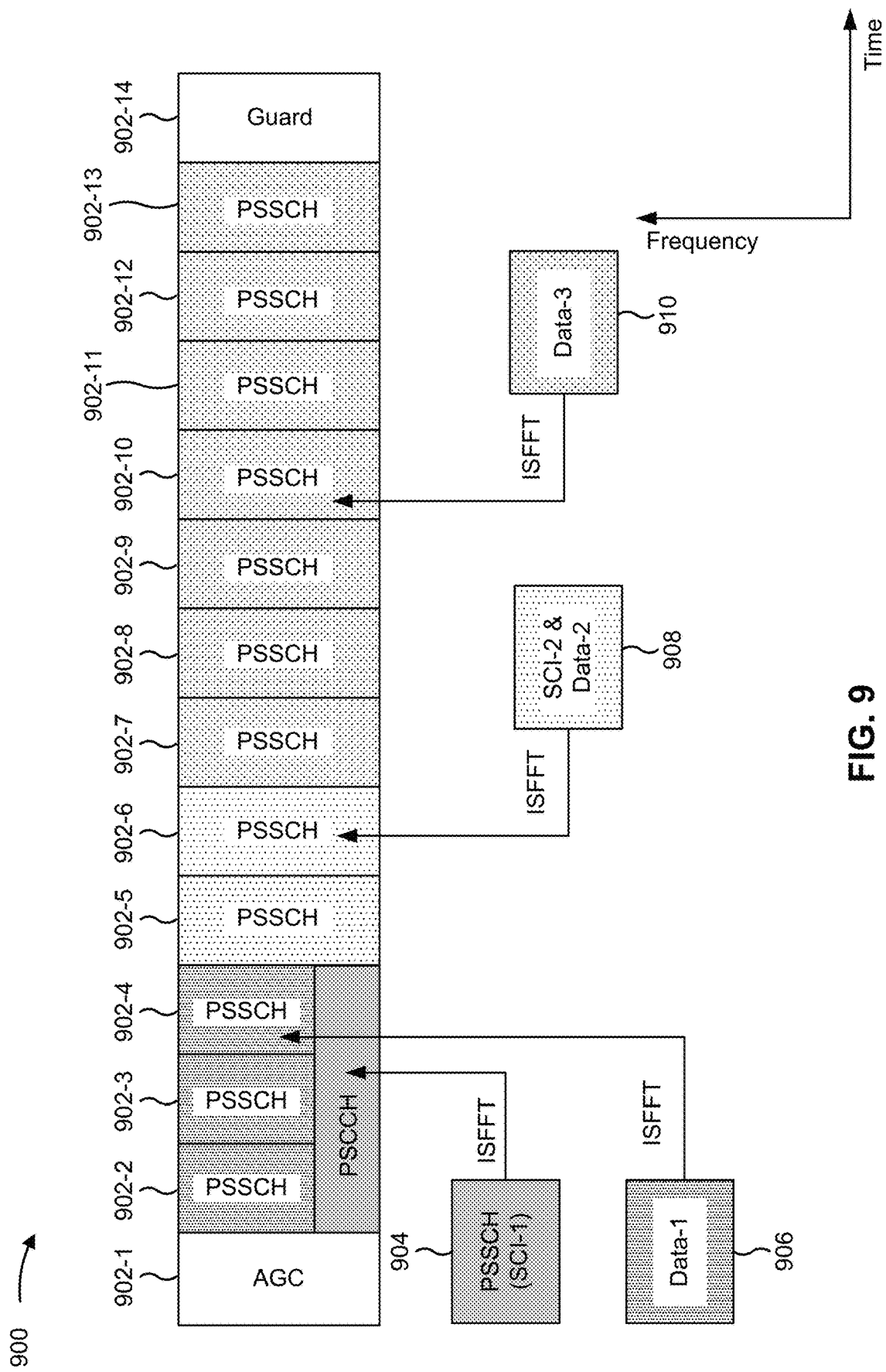

FIG. 9 is a diagram illustrating an example 900 of OTFS precoding and decoding of control channel and shared channel communications, in accordance with the present disclosure. In particular, the example 900 includes an example of OTFS precoding and decoding of sidelink control channel and sidelink shared channel communications between the UE 120a and the UE 120e. However, the techniques described herein may be used for access link communications, including downlink communications from a base station 110 to a UE 120 and uplink communications from a UE 120 to a base station 110.

The UE 120a may perform operations described above in connection with FIGS. 6A, 6B, and/or 7 to precode a PSCCH communication using a single ISFFT, and to precode a PSSCH communication using a plurality of ISFFTs. The UE 120a may transmit the PSCCH communication and the PSSCH communication in a slot after precoding the PSCCH communication and the PSSCH communication.

As shown in FIG. 9, the slot includes a plurality of symbols 902-1 through 902-14. However, the slot may include another quantity of symbols. The UE 120a may perform an AGC transmission in slot 902-1, may transmit the PSCCH communication in symbols 902-2 through 902-4, and may transmit the PSSCH communication in symbols 902-2 through 902-13. The PSCCH communication is frequency multiplexed with a portion of the PSSCH communication in the symbols 902-2 through 902-4.

As indicated above, the UE 120a may determine the quantity of ISFFTs, and the configuration for the ISFFTs, for precoding the PSSCH communication based at least in part on a quantity of total resources of the SCI-2 of the PSSCH communication. As shown in the example 900 in FIG. 9, the UE 120a determines that the quantity of total resources (e.g., a quantity of time domain resources and/or a quantity of frequency domain resources), in the slot, for the SCI-2 is greater than a quantity of total resources (e.g., a quantity of time domain resources and/or a quantity of frequency domain resources) that are frequency multiplexed with the PSCCH communication in the slot.

Accordingly, the UE 120a may precode delay-Doppler symbols 904 of the PSCCH communication (which includes SCI-1) using a first ISFFT. The UE 120a may precode delay-Doppler symbols 906 of a first data portion of the PSSCH communication using a second ISFFT. The UE 120a may precode delay-Doppler symbols 908 of the SCI-2 and a second data portion of the PSSCH communication using a third ISFFT. The UE 120a may precode delay-Doppler symbols 910 of a third data portion of the PSSCH communication using a fourth ISFFT. The first ISFFT, the second ISFFT, the third ISFFT, and the fourth ISFFT are different ISFFTs. Alternatively, the UE 120a may precode delay-Doppler symbols of the SCI-2 using a separate ISFFT (e.g., without including delay-Doppler symbols for a data portion of the PSSCH communication).

Similarly, the UE 120e may decode the delay-Doppler symbols 904 of the PSCCH communication using a first SFFT. The UE 120e may decode the delay-Doppler symbols 906 of the first data portion of the PSSCH communication using a second SFFT. The UE 120e may decode the delay-Doppler symbols 908 of the SCI-2 and the second data portion of the PSSCH communication using a third SFFT. The UE 120e may decode the delay-Doppler symbols 910 of the third data portion of the PSSCH communication using a fourth SFFT. The first SFFT, the second SFFT, the third SFFT, and the fourth SFFT are different SFFTs. Alternatively, the UE 120e may decode delay-Doppler symbols of the SCI-2 using a separate SFFT (e.g., without including delay-Doppler symbols for a data portion of the PSSCH communication).

The UE 120e configures the size (e.g., the quantity of resources) of the first data portion to match the total quantity of resources that are frequency multiplexed with the PSCCH communication in the slot. The first data portion is frequency multiplexed with the PSCCH communication in the slot, in symbols 802-2 through 802-4. This reduces and/or eliminates unused resources in the slot which increases sidelink channel efficiency. The UE 120e configures the size (e.g., the quantity of resources) of the second data portion that is multiplexed with the SCI-2 so that the total quantity of resources of the SCI-2 and the second data portion are equal to the nearest integer multiple of total resources in one symbol. This further reduces and/or eliminates unused resources in the slot which increases sidelink channel efficiency. The SCI-2 and the second data portion are transmitted in one or more symbols in the slot (e.g., symbols 902-5 and 902-6) after the symbols in which the PSCCH communication (and the first data portion) is transmitted. The third data portion is transmitted in one or more symbols in the slot (e.g., symbols 902-7 through 902-13) after the SCI-2 and the second data portion.

As indicated above, FIG. 9 is provided an examples. Other examples may differ from what is described with respect to FIG. 9.

Figure 10:
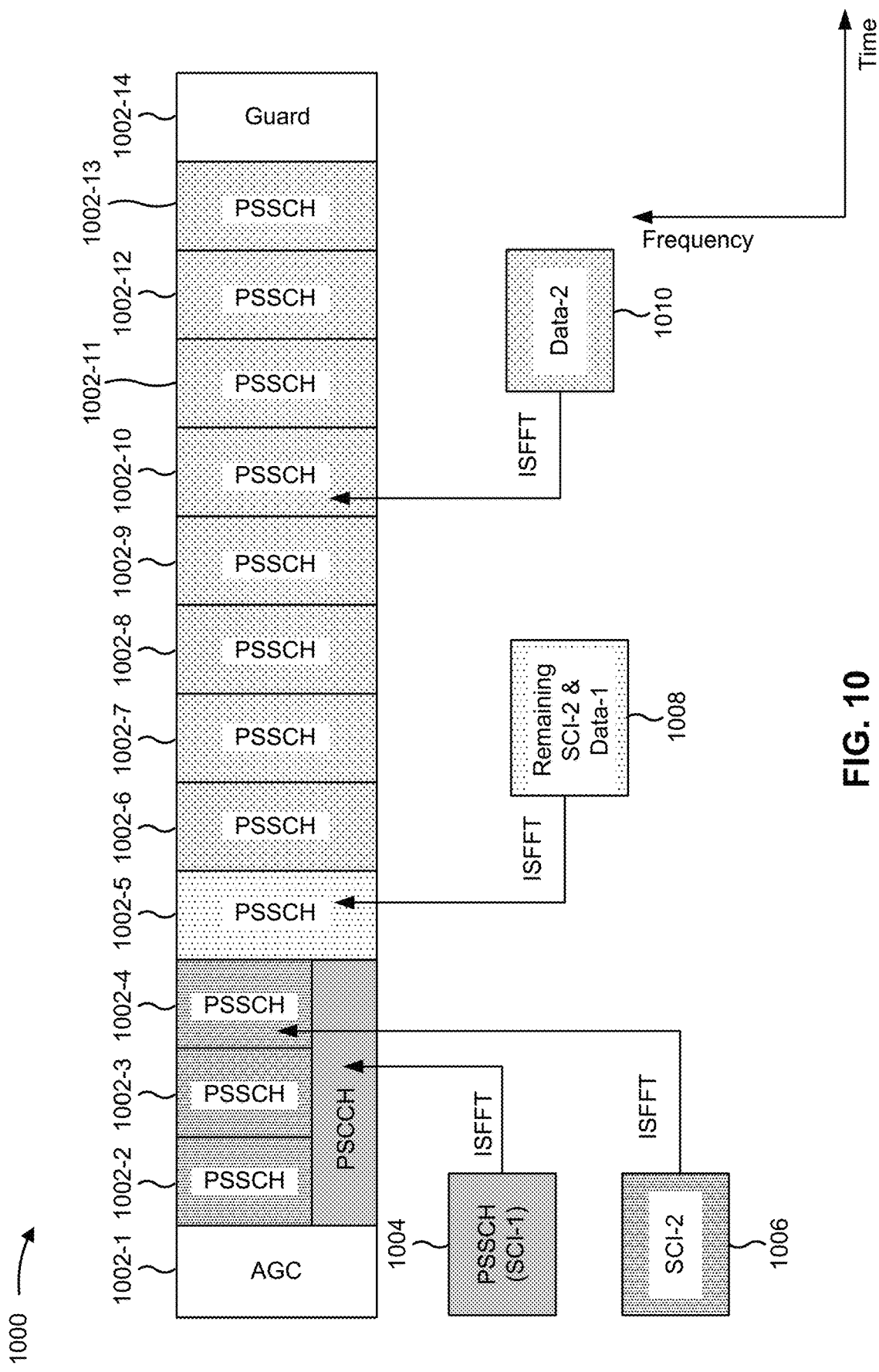

FIG. 10 is a diagram illustrating an example 1000 of OTFS precoding and decoding of control channel and shared channel communications, in accordance with the present disclosure. In particular, the example 1000 includes an example of OTFS precoding and decoding of sidelink control channel and sidelink shared channel communications between the UE 120a and the UE 120e. However, the techniques described herein may be used for access link communications, including downlink communications from a base station 110 to a UE 120 and uplink communications from a UE 120 to a base station 110.

The UE 120a may perform operations described above in connection with FIGS. 6A, 6B, and/or 7 to precode a PSCCH communication using a single ISFFT, and to precode a PSSCH communication using a plurality of ISFFTs. The UE 120a may transmit the PSCCH communication and the PSSCH communication in a slot after precoding the PSCCH communication and the PSSCH communication.

As shown in FIG. 10, the slot includes a plurality of symbols 1002-1 through 1002-14. However, the slot may include another quantity of symbols. The UE 120a may perform an AGC transmission in slot 1002-1, may transmit the PSCCH communication in symbols 1002-2 through 1002-4, and may transmit the PSSCH communication in symbols 1002-2 through 1002-13. The PSCCH communication is frequency multiplexed with a portion of the PSSCH communication in the symbols 1002-2 through 1002-4.

As indicated above, the UE 120a may determine the quantity of ISFFTs, and the configuration for the ISFFTs, for precoding the PSSCH communication based at least in part on a quantity of total resources of the SCI-2 of the PSSCH communication. As shown in the example 1000 in FIG. 10, the UE 120a determines that the quantity of total resources (e.g., a quantity of time domain resources and/or a quantity of frequency domain resources), in the slot, for the SCI-2 is greater than a quantity of total resources (e.g., a quantity of time domain resources and/or a quantity of frequency domain resources) that are frequency multiplexed with the PSCCH communication in the slot.

Accordingly, the UE 120a may precode delay-Doppler symbols 1004 of the PSCCH communication (which includes SCI-1) using a first ISFFT. The UE 120a may precode delay-Doppler symbols 1006 of a first portion of the SCI-2 using a second ISFFT. The UE 120a may precode delay-Doppler symbols 1008 of a second portion of the SCI-2 and a first data portion of the PSSCH communication using a third ISFFT. The UE 120a may precode delay-Doppler symbols 1010 of a second data portion of the PSSCH communication using a fourth ISFFT. The first ISFFT, the second ISFFT, the third ISFFT, and the fourth ISFFT are different ISFFTs.

Similarly, the UE 120e may decode the delay-Doppler symbols 1004 of the PSCCH communication using a first SFFT. The UE 120e may decode the delay-Doppler symbols 1006 of the first portion of the SCI-2 using a second SFFT. The UE 120e may decode the delay-Doppler symbols 1008 of the second portion of the SCI-2 and the first data portion of the PSSCH communication using a third SFFT. The UE 120e may decode the delay-Doppler symbols 1010 of the second data portion of the PSSCH communication using a fourth SFFT. The first SFFT, the second SFFT, the third SFFT, and the fourth SFFT are different SFFTs.

The UE 120e configures the size (e.g., the quantity of resources) of the first portion of the SCI-2 to match the total quantity of resources that are frequency multiplexed with the PSCCH communication in the slot. The first portion of the SCI-2 is frequency multiplexed with the PSCCH communication in the slot, in symbols 802-2 through 802-4. This reduces and/or eliminates unused resources in the slot which increases sidelink channel efficiency. The UE 120e configures the size (e.g., the quantity of resources) of the first data portion that is multiplexed with the second portion of the SCI-2 so that the total quantity of resources of the second portion of the SCI-2 and the first data portion are equal to the nearest integer multiple of total resources in one symbol. This further reduces and/or eliminates unused resources in the slot which increases sidelink channel efficiency. The second portion of the SCI-2 and the first data portion are transmitted in one or more symbols in the slot (e.g., symbol 1002-) after the symbols in which the PSCCH communication (and the first portion of the SCI-2) is transmitted. The second data portion is transmitted in one or more symbols in the slot (e.g., symbols 1002-6 through 1002-13) after the second portion of the SCI-2 and the first data portion.

As indicated above, FIG. 10 is provided an examples. Other examples may differ from what is described with respect to FIG. 10.

Figure 11:
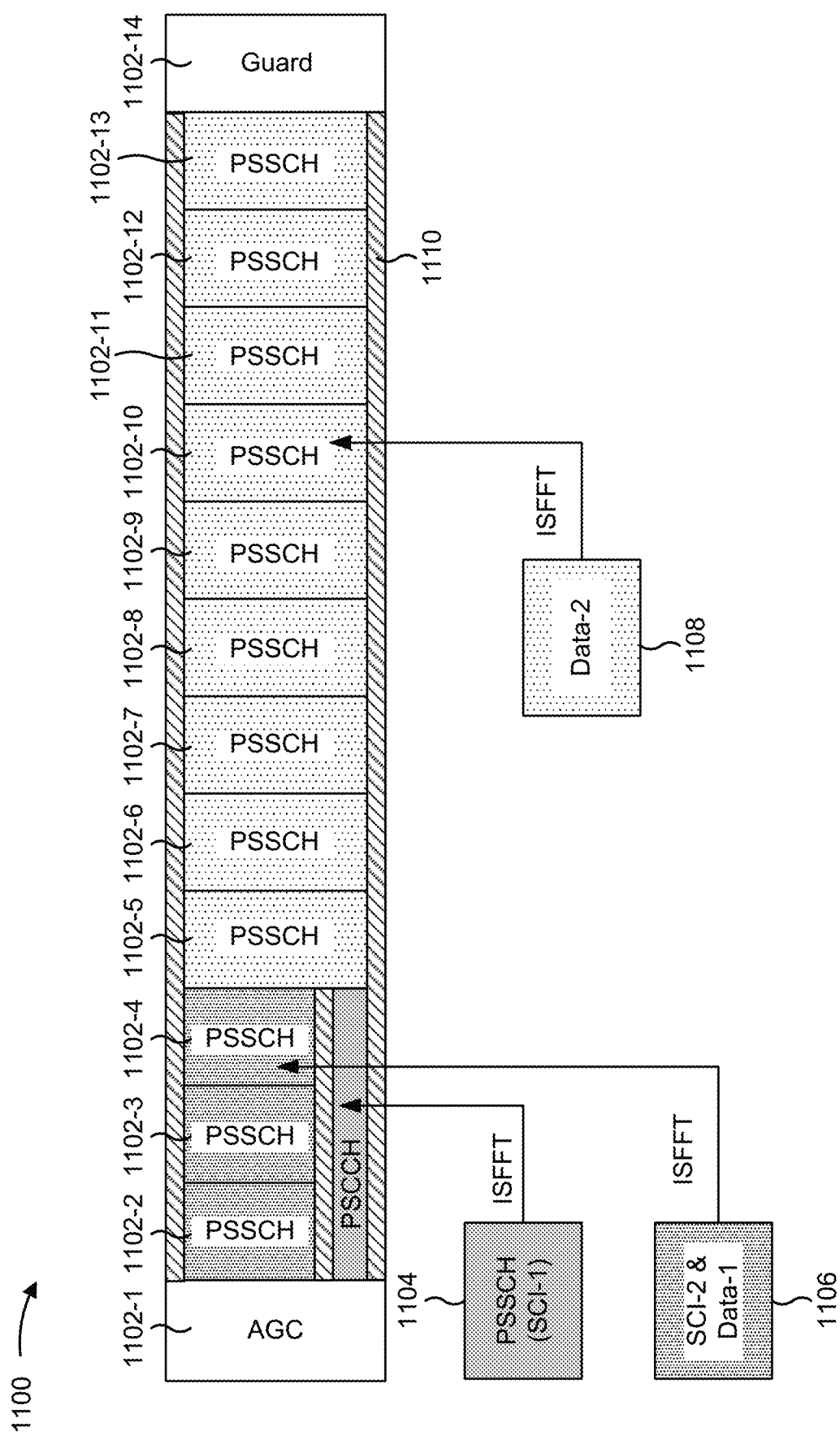

FIG. 11 is a diagram illustrating an example 1100 of OTFS precoding and decoding of control channel and shared channel communications, in accordance with the present disclosure. In particular, the example 1100 includes an example of OTFS precoding and decoding of sidelink control channel and sidelink shared channel communications between the UE 120a and the UE 120e. However, the techniques described herein may be used for access link communications, including downlink communications from a base station 110 to a UE 120 and uplink communications from a UE 120 to a base station 110.

The UE 120a may perform operations described above in connection with FIGS. 6A, 6B, and/or 7 to precode a PSCCH communication using a single ISFFT, and to precode a PSSCH communication using a plurality of ISFFTs. The UE 120a may transmit the PSCCH communication and the PSSCH communication in a slot after precoding the PSCCH communication and the PSSCH communication.

As shown in FIG. 11, precoding of the PSCCH communication and the PSSCH communication is performed in a similar manner as described above in connection with FIG. 8. Accordingly, like elements and/or reference numbers are not redescribed for purposes of brevity. As further shown in FIG. 11, however, the example 1100 includes guard subcarriers 1110 in the slot. The guard subcarriers 1110 may be included at the edges of the frequency domain resources of the slot to reduce and/or prevent interference between the ISFFTs that are used in the slot.

For example, a first set of guard subcarriers 1110 may be included between the at the edges of the frequency resources for the PSCCH communication in the symbols 1102-2 through 1102-4. As another example, a second set of guard subcarriers 1110 may be included at the edges of the frequency resources for the SCI-2 and the first data portion of the PSSCH communication in the symbols 1102-2 through 1102-4. As another example, a third set of guard subcarriers 1110 may be included at the edges of the frequency resources for the second data portion of the PSSCH communication in the symbols 1102-5 through 1102-13.

In some aspects, the guard subcarriers 1110 include zero-value symbols and/or resource elements. In some aspects, the guard subcarriers 1110 include one or more cyclic prefixes of symbols in the slot. As an example, a lower frequency guard subcarrier 1110 of the PSSCH communication may include a cyclic prefix of the PSSCH communication near an upper frequency of the PSSCH communication, and an upper frequency guard subcarrier 1110 of the PSSCH communication may include a cyclic prefix of the PSSCH communication near a lower frequency of the PSSCH communication.

As indicated above, FIG. 11 is provided an examples. Other examples may differ from what is described with respect to FIG. 11. While the example 1100 is illustrated and described in the context of the example 800 of FIG. 8, the techniques described in connection with the example 1100 may be implemented in other sidelink slot configurations in which a plurality of ISFFTs are used to precode sidelink communications.

Figures 12A, 12B:
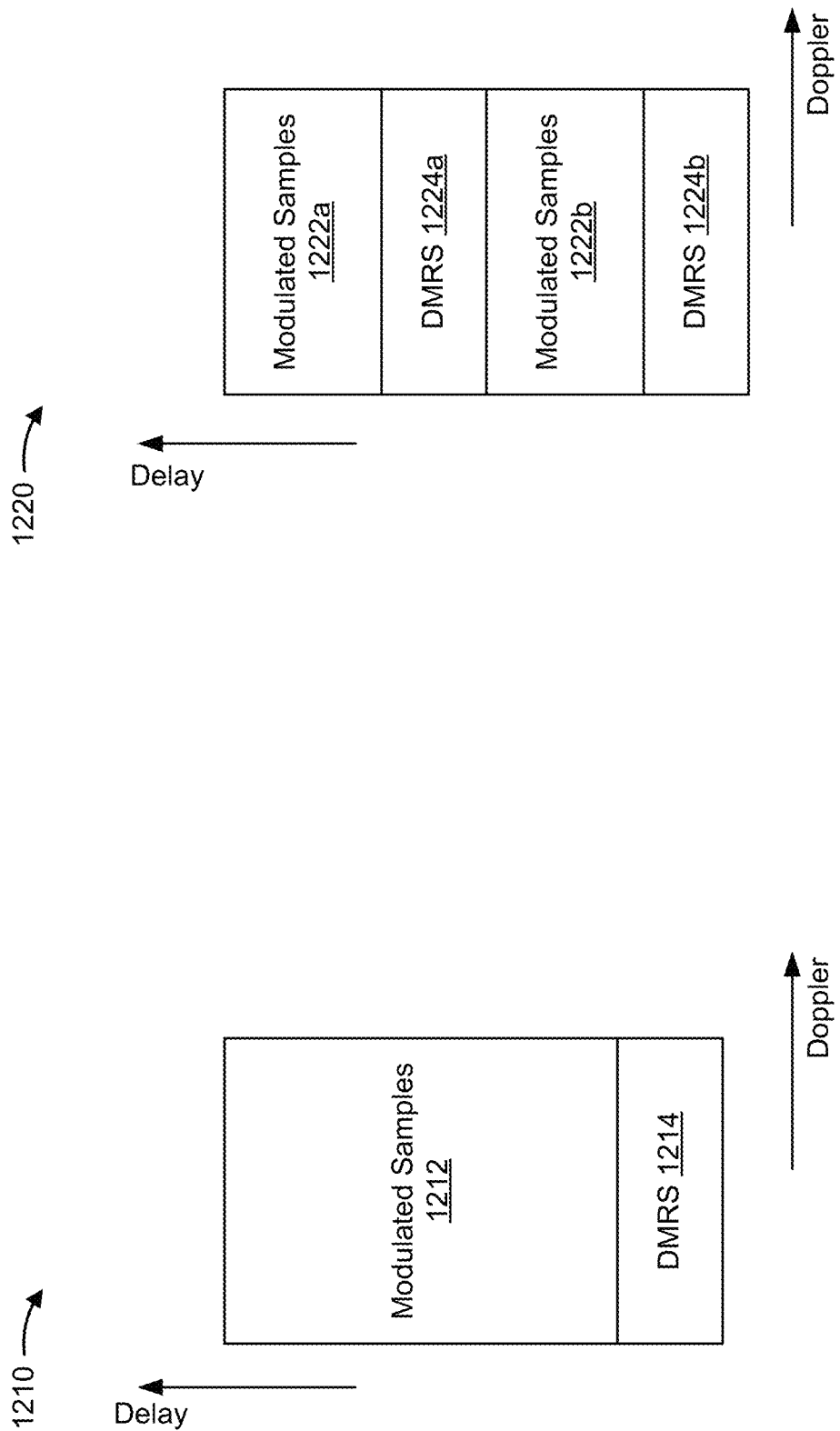

FIGS. 12A and 12B are diagram illustrating examples of OTFS precoding and decoding of control channel and shared channel communications, in accordance with the present disclosure. In particular, the examples illustrated in FIGS. 12A and 12B include examples of OTFS precoding and decoding of sidelink control channel and sidelink shared channel communications between the UE 120a and the UE 120e, where DMRS resources are included. However, the techniques described herein may be used for access link communications, including downlink communications from a base station 110 to a UE 120 and uplink communications from a UE 120 to a base station 110.

As shown in an example 1210 in FIG. 12A, modulated samples 1212 may be included along with a DMRS 1214 (e.g., DMRS samples). The modulated samples 1212 and the DMRS 1214 include delay-Doppler symbols. The modulated samples 1212 and the DMRS 1214 may be precoded using the same ISFFT (and may be decoded using the same SFFT). In some aspects, the modulated samples 1212 are associated with a PSCCH communication. In some aspects, the modulated samples 1212 are associated with SCI-2 of a PSSCH communication, data of the PSSCH communication, or a combination thereof.

As further shown in the example 1210 in FIG. 12A, the DMRS 1214 is placed in the delay-Doppler domain with continuous delay-Doppler resources rather than uniform spacing in an OFDM waveform. The length or size of the DMRS 1214 for OTFS in the delay domain may be configured as twice the delay spread to bandwidth ratio. The length or size of the DMRS 1214 in the Doppler domain may be configured as equal to the quantity of symbols for the modulated samples 1212. If the quantity of frequency resources for the ISFFT that is to be used for the modulated samples 1212 and the DMRS 1214 is M, the total quantity of resources allocated to the DMRS 1214 may be configured as $$2\frac{\tau_{max}}{M\Delta f}$$

where $\tau_{max}$ is the maximum delay spread and $\Delta f$ is the subcarrier spacing.

The DMRS 1214 can be used for channel estimation in addition to using the PSCCH communication and/or the data of the PSSCH communication. The DMRS 1214 may be configured with good correlation properties, such as a Zad-off-Chu sequence or a pseudo random (PN) noise sequence, to increase channel estimation accuracy.

As shown in an example 1220 in FIG. 12B, modulated sample portions 1222a and 1222b may be included along with DMRS portions 1224a and 1224b. A plurality of DMRS portions 1224a and 1224b may be included to improve channel tracking in cases where high Doppler spread and/or high frequency offset are experienced on a wireless sidelink channel. The DMRS portions 1224a and 1224b may be placed uniformly across the delay-Doppler plane with the modulated sample portions 1222a. The length or size for each DMRS portion in the delay domain may be determined as described above. In some aspects, a different quantity of DMRS portions and/or a different quantity of modulated sample portions are included.

As indicated above, FIGS. 12A and 12B are provided as examples. Other examples may differ from what is described with respect to FIGS. 12A and 12B.

Figure 13:
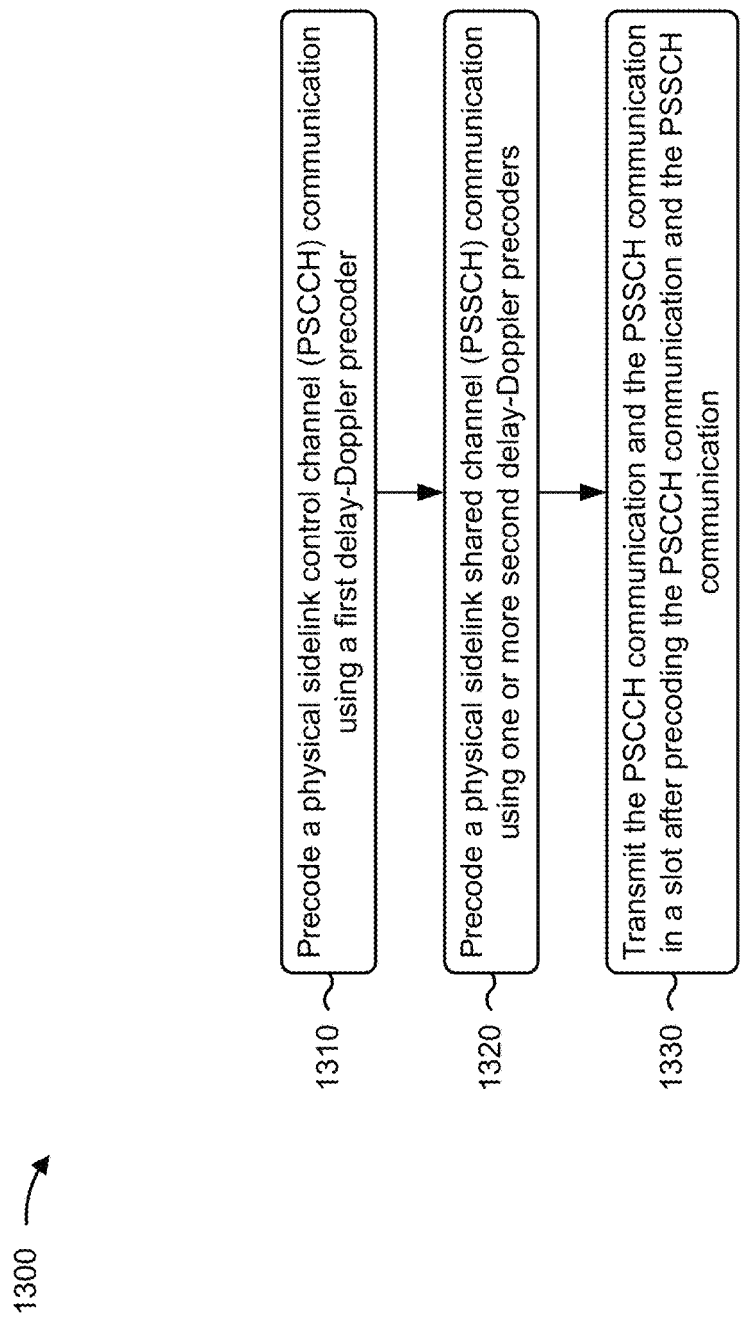
FIG. 13 is a diagram illustrating an example process associated with OTFS precoding of control channel and shared channel communications, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with OTFS precoding of control channel and shared channel communications.

As shown in FIG. 13, in some aspects, process 1300 may include precoding a PSCCH communication using a first delay-Doppler precoder (block 1310). For example, the UE (e.g., using communication manager 140 and/or precoding component 1508, depicted in FIG. 15) may precode a PSCCH communication using a first delay-Doppler precoder, as described above.

As further shown in FIG. 13, in some aspects, process 1300 may include precoding a PSSCH communication using one or more second delay-Doppler precoders (block 1320). For example, the UE (e.g., using communication manager 140 and/or precoding component 1508, depicted in FIG. 15) may precode a PSSCH communication using one or more second delay-Doppler precoders, as described above.

As further shown in FIG. 13, in some aspects, process 1300 may include transmitting the PSCCH communication and the PSSCH communication in a slot after precoding the PSCCH communication and the PSSCH communication (block 1330). For example, the UE (e.g., using communication manager 140 and/or transmission component 1504, depicted in FIG. 15) may transmit the PSCCH communication and the PSSCH communication in a slot after precoding the PSCCH communication and the PSSCH communication, as described above.

Process 1300 may include additional aspects, such as any single aspect or any combination of aspects described below and/or in connection with one or more other processes described elsewhere herein.

In a first aspect, the first delay-Doppler precoder includes a first ISFFT, the one or more second delay-Doppler precoders include one or more second ISFFTs, precoding the PSCCH communication comprises converting a plurality of delay-Doppler symbols of the PSCCH communication to a first plurality of time-frequency domain symbols using the first ISFFT, and wherein precoding the PSSCH communication comprises converting a plurality of delay-Doppler symbols of the PSSCH communication to a second plurality of time-frequency domain symbols using the one or more second ISFFTs.

In a second aspect, alone or in combination with the first aspect, process 1300 includes modulating the first plurality of time-frequency domain symbols and the second plurality of time-frequency domain symbols to generate a time domain signal for the PSCCH communication and the PSSCH communication, wherein transmitting the PSCCH communication and the PSSCH communication comprises transmitting the time domain signal.

In a third aspect, alone or in combination with one or more of the first and second aspects, a quantity of total resources, in the slot, for SCI-2 of the PSSCH communication is less than a quantity of total resources that are frequency multiplexed with the PSCCH communication in the slot, and wherein precoding the PSSCH communication using the one or more second delay-Doppler precoders comprises precoding the SCI-2 and a first data portion of the PSSCH communication using a third delay-Doppler precoder of the one or more second delay-Doppler precoders, and precoding a second data portion of the PSSCH communication using a fourth delay-Doppler precoder of the one or more second delay-Doppler precoders.

In a fourth aspect, alone or in combination with one or more of the first through third aspects, a quantity of total resources, in the slot, for SCI-2 of the PSSCH communication is greater than a quantity of total resources that are frequency multiplexed with the PSCCH communication in the slot, and wherein precoding the PSSCH communication using the one or more second delay-Doppler precoders comprises precoding a first data portion of the PSSCH communication using a third delay-Doppler precoder of the one or more second delay-Doppler precoders, precoding the SCI-2 and a second data portion of the PSSCH communication using a fourth delay-Doppler precoder of the one or more second delay-Doppler precoders, and precoding a third data portion of the PSSCH communication using a fifth delay-Doppler precoder of the one or more second delay-Doppler precoders.

In a fifth aspect, alone or in combination with one or more of the first through fourth aspects, a quantity of total resources, in the slot, for SCI-2 of the PSSCH communication is greater than a quantity of total resources that are frequency multiplexed with the PSCCH communication in the slot, and wherein precoding the PSSCH communication using the one or more second delay-Doppler precoders comprises precoding a first portion of the SCI-2 using a third delay-Doppler precoder of the one or more second delay-Doppler precoders, precoding a second portion of the SCI-2 and a first data portion of the PSSCH communication using a fourth delay-Doppler precoder of the one or more second delay-Doppler precoders, and precoding a second data portion of the PSSCH communication using a fifth delay-Doppler precoder of the one or more second delay-Doppler precoders.

In a sixth aspect, alone or in combination with one or more of the first through fifth aspects, a quantity of total resources, in the slot, for SCI-2 of the PSSCH communication is equal to a quantity of total resources that are frequency multiplexed with the PSCCH communication in the slot, and wherein precoding the PSSCH communication using the one or more second delay-Doppler precoders comprises precoding the SCI-2 using a third delay-Doppler precoder of the one or more second delay-Doppler precoders, and precoding a data portion of the PSSCH communication using a fourth delay-Doppler precoder of the one or more second delay-Doppler precoders.

In a seventh aspect, alone or in combination with one or more of the first through sixth aspects, transmitting the PSCCH communication and the PSSCH communication comprises transmitting the PSCCH communication and the PSSCH communication with one or more guard subcarriers between frequency resources of the PSCCH communication and frequency resources of the PSSCH communication, wherein the guard subcarriers comprise at least one of zero-value symbols, or one or more cyclic prefixes of symbols in which the PSCCH communication and the PSSCH communication are transmitted.

In an eighth aspect, alone or in combination with one or more of the first through seventh aspects, precoding the PSCCH communication using the one or more first delay-Doppler precoders comprises precoding a plurality of delay-Doppler symbols of the PSCCH communication and a plurality of delay-Doppler symbols of a first DMRS to a first plurality of time-frequency domain symbols using the one or more first delay-Doppler precoders, and wherein precoding the PSSCH communication using the one or more second delay-Doppler precoders comprises precoding a plurality of delay-Doppler symbols of the PSSCH communication and a plurality of delay-Doppler symbols of a second DMRS to a second plurality of time-frequency domain symbols using the one or more second delay-Doppler precoders.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
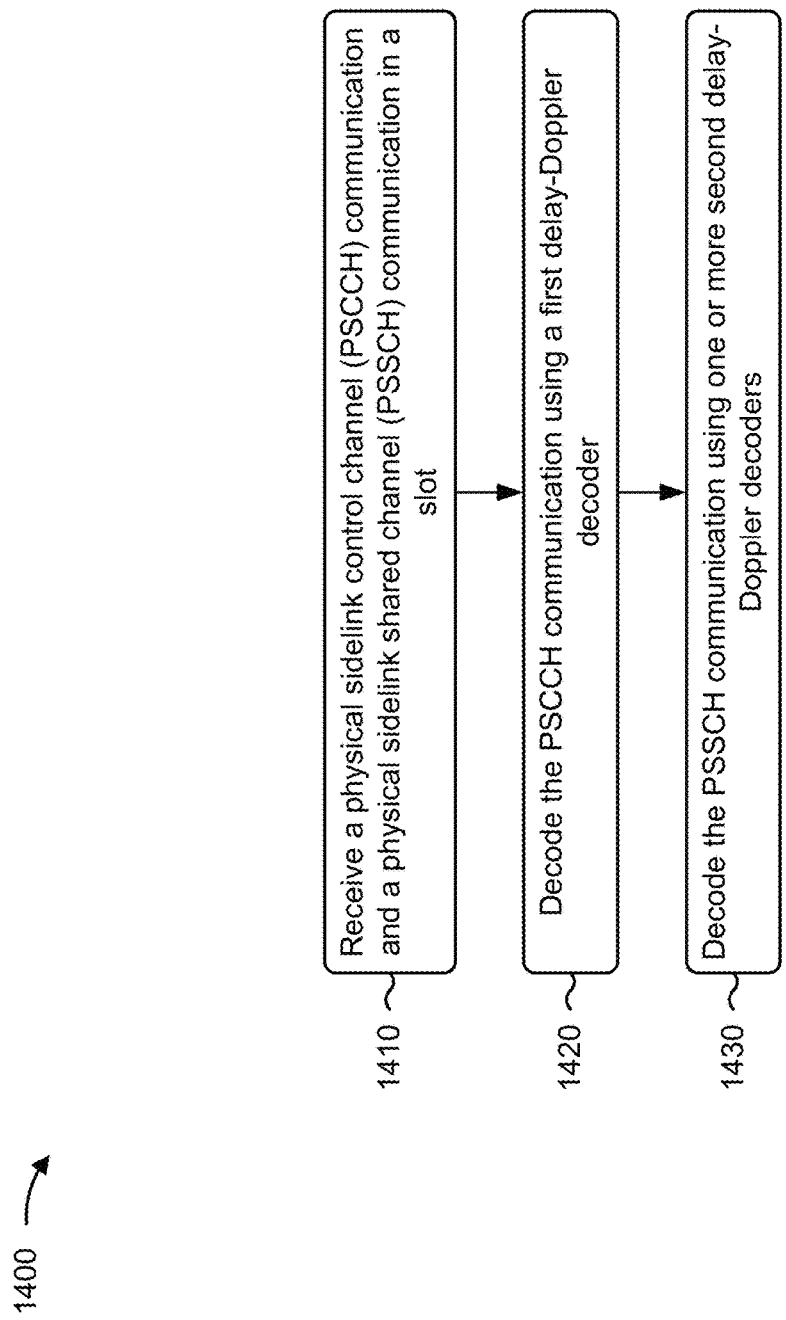
FIG. 14 is a diagram illustrating an example process associated with OTFS decoding of control channel and shared channel communications, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with OTFS decoding of control channel and shared channel communications.

As shown in FIG. 14, in some aspects, process 1400 may include receiving a PSCCH communication and a PSSCH communication in a slot (block 1410). For example, the UE (e.g., using communication manager 140 and/or reception component 1602, depicted in FIG. 16) may receive a PSCCH communication and a PSSCH communication in a slot, as described above.

As further shown in FIG. 14, in some aspects, process 1400 may include decoding the PSCCH communication using a first delay-Doppler decoder (block 1420). For example, the UE (e.g., using communication manager 140 and/or decoding component 1608, depicted in FIG. 16) may decode the PSCCH communication using a first delay-Doppler decoder, as described above.

As further shown in FIG. 14, in some aspects, process 1400 may include decoding the PSSCH communication using one or more second delay-Doppler decoders (block 1430). For example, the UE (e.g., using communication manager 140 and/or decoding component 1608, depicted in FIG. 16) may decode the PSSCH communication using one or more second delay-Doppler decoders, as described above.

Process 1400 may include additional aspects, such as any single aspect or any combination of aspects described below and/or in connection with one or more other processes described elsewhere herein.

In a first aspect, the first delay-Doppler decoder includes a first SFFT, the one or more second delay-Doppler decoders include one or more second SFFTs, decoding the PSCCH communication comprises converting a plurality of time-frequency domain symbols of the PSCCH communication to a first plurality of delay-Doppler symbols using the first SFFT, and wherein decoding the PSSCH communication comprises converting a plurality of time-frequency domain symbols of the PSSCH communication to a second plurality of delay-Doppler symbols using the one or me second SFFTs.

In a second aspect, alone or in combination with the first aspect, a quantity of total resources, in the slot, for SCI-2 of the PSSCH communication is less than a quantity of total resources that are frequency multiplexed with the PSCCH communication in the slot, and wherein decoding the PSSCH communication using the one or more second delay-Doppler decoders comprises decoding the SCI-2 and a first data portion of the PSSCH communication using a third delay-Doppler decoder of the one or more second delay-Doppler decoders, and decoding a second data portion of the PSSCH communication using a fourth delay-Doppler decoder of the one or more second delay-Doppler decoders.

In a third aspect, alone or in combination with one or more of the first and second aspects, a quantity of total resources, in the slot, for SCI-2 of the PSSCH communication is greater than a quantity of total resources that are frequency multiplexed with the PSCCH communication in the slot, and wherein decoding the PSSCH communication using the one or more second delay-Doppler decoders comprises decoding a first data portion of the PSSCH communication using a third delay-Doppler decoder of the one or more second delay-Doppler decoders, decoding the SCI-2 and a second data portion of the PSSCH communication using a fourth delay-Doppler decoder of the one or more second delay-Doppler decoders, and decoding a third data portion of the PSSCH communication using a fifth delay-Doppler decoder of the one or more second delay-Doppler decoders.

In a fourth aspect, alone or in combination with one or more of the first through third aspects, a quantity of total resources, in the slot, for SCI-2 of the PSSCH communication is greater than a quantity of total resources that are frequency multiplexed with the PSCCH communication in the slot, and wherein decoding the PSSCH communication using the one or more second delay-Doppler decoders comprises decoding a first portion of the SCI-2 using a third delay-Doppler decoder of the one or more second delay-Doppler decoders, decoding a second portion of the SCI-2 and a first data portion of the PSSCH communication using a fourth delay-Doppler decoder of the one or more second delay-Doppler decoders, and decoding a second data portion of the PSSCH communication using a fifth delay-Doppler decoder of the one or more second delay-Doppler decoders.

In a fifth aspect, alone or in combination with one or more of the first through fourth aspects, a quantity of total resources, in the slot, for SCI-2 of the PSSCH communication is equal to a quantity of total resources that are frequency multiplexed with the PSCCH communication in the slot, and wherein decoding the PSSCH communication using the one or more second delay-Doppler decoders comprises decoding the SCI-2 using a third delay-Doppler decoder of the one or more second delay-Doppler decoders, and decoding a data portion of the PSSCH communication using a fourth delay-Doppler decoder of the one or more second delay-Doppler decoders.

In a sixth aspect, alone or in combination with one or more of the first through fifth aspects, decoding the PSCCH communication using the one or more first delay-Doppler decoders comprises decoding a plurality of delay-Doppler symbols of the PSSCH communication and a plurality of delay-Doppler symbols of a first DMRS to a first plurality of time-frequency domain symbols using the one or more first delay-Doppler decoders, and wherein decoding the PSSCH communication using the one or more second delay-Doppler decoders comprises decoding a plurality of delay-Doppler symbols of the PSSCH communication and a plurality of delay-Doppler symbols of a second DMRS to a second plurality of time-frequency domain symbols using the one or more second delay-Doppler decoders.

In a seventh aspect, alone or in combination with one or more of the first through sixth aspects, process 1400 includes identifying a location, in the slot, of SCI-2 of the PSSCH communication based at least in part on at least one of an explicit indication, included in the PSCCH communication, of the location of the SCI-2, or a quantity of frequency resources, in the slot, for the SCI-2 and a quantity of frequency resources multiplexed with the PSSCH communication in the slot.

In an eighth aspect, alone or in combination with one or more of the first through seventh aspects, decoding the PSSCH communication using the one or more second delay-Doppler decoders comprises decoding SCI-2 of the PSSCH communication using a third delay-Doppler decoder of the one or more second delay-Doppler decoders, and wherein the method further comprises determining, based at least in part on the SCI-2, that a data portion of the PSSCH communication is not associated with the UE, and refraining from decoding the data portion of the PSSCH communication using a fourth delay-Doppler decoder of the one or more second delay-Doppler decoders based at least in part on determining that the data portion of the PSSCH communication is not intended for the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
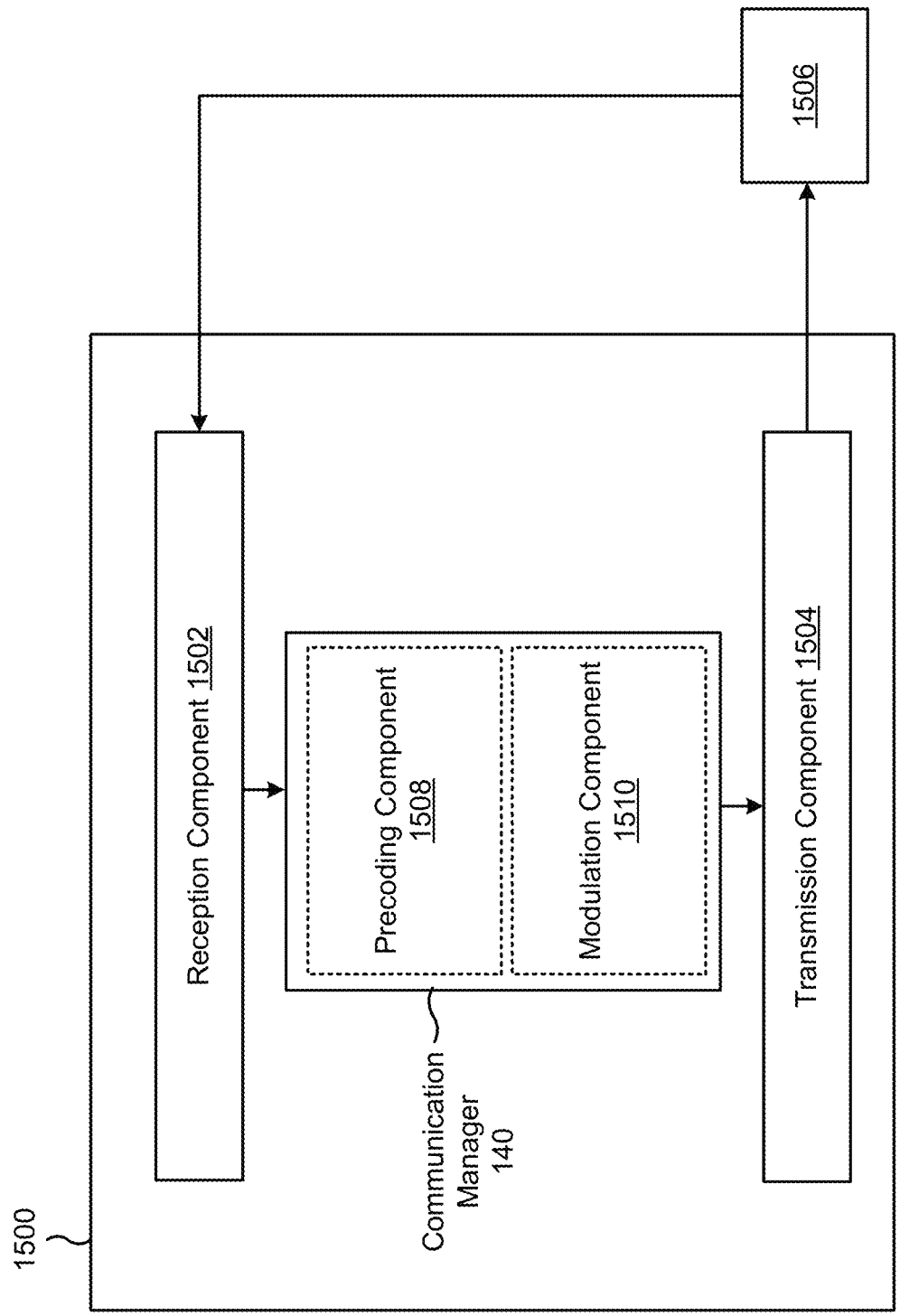
FIGS. 15 and 16 are diagrams of example apparatuses for wireless communication, in accordance with the present disclosure.

FIG. 15 is a diagram of an example apparatus 1500 for wireless communication. The apparatus 1500 may be a UE 120, or a UE 120 may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a precoding component 1508 or a modulation component 1510, among other examples.

In some aspects, the apparatus 1500 may be configured to perform one or more operations described herein in connection with FIG. 6A-12B. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE 120 described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE 120 described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE 120 described in connection with FIG. 2. In some aspects, the transmission component 1504 may be co-located with the reception component 1502 in a transceiver.

The precoding component 1508 (or the communication manager 140 using the precoding component 1508) may precode a PSCCH communication using a first delay-Doppler precoder. The precoding component 1508 (or the communication manager 140 using the precoding component 1508) may precode a PSSCH communication using one or more second delay-Doppler precoders. The transmission component 1504 may transmit (e.g., to the apparatus 1506) the PSCCH communication and the PSSCH communication in a slot after the precoding component 1508 precodes the PSCCH communication and the PSSCH communication.

In some aspects, the modulation component 1510 may modulate the first plurality of time-frequency domain symbols and the second plurality of time-frequency domain symbols to generate a time domain signal for the PSCCH communication and the PSSCH communication wherein transmitting the PSCCH communication and the PSSCH communication comprises transmitting the time domain signal.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
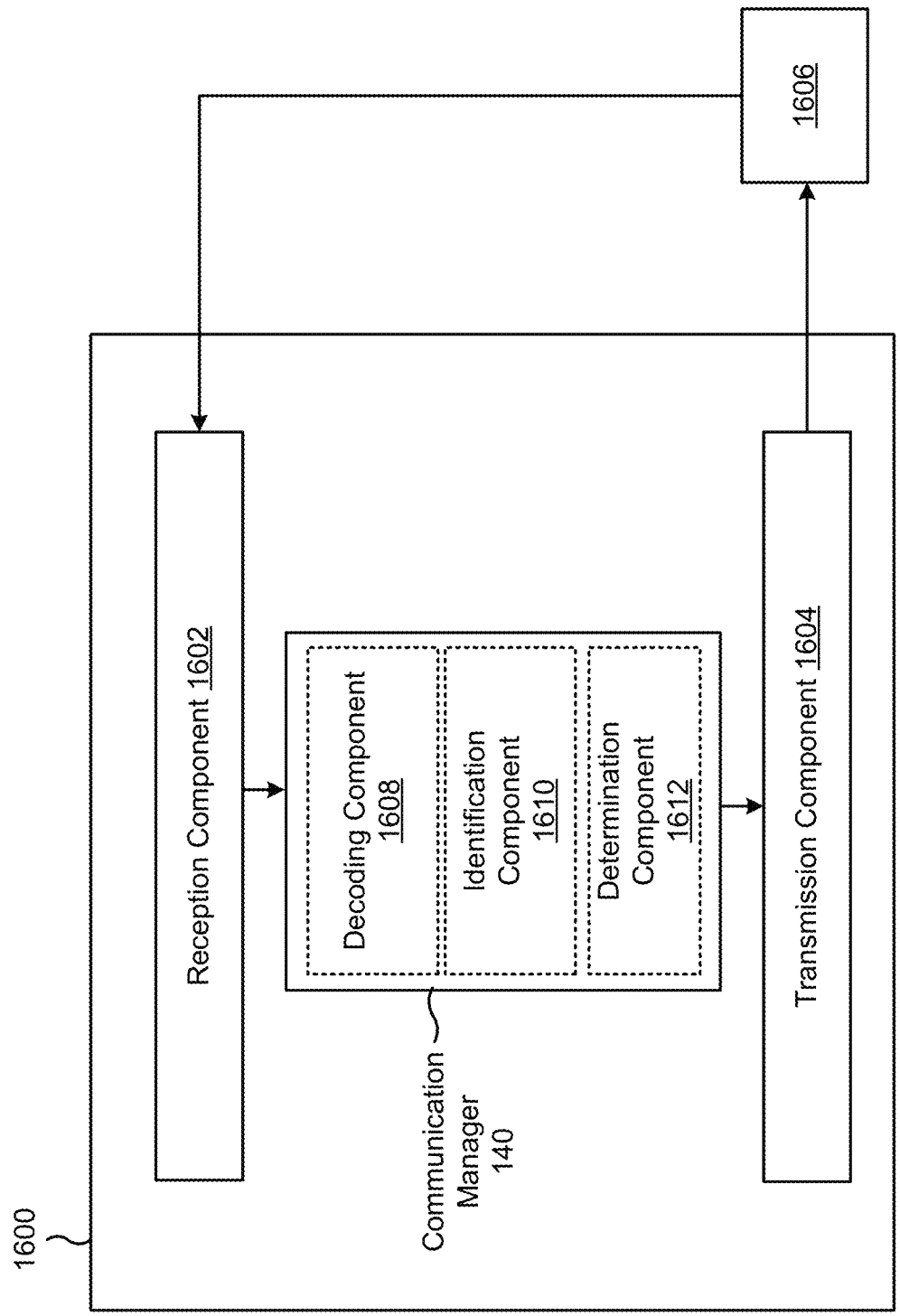

FIG. 16 is a diagram of an example apparatus 1600 for wireless communication. The apparatus 1600 may be a UE 120, or a UE 120 may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a decoding component 1608, an identification component 1610, or a determination component 1612, among other examples.

In some aspects, the apparatus 1600 may be configured to perform one or more operations described herein in connection with FIG. 6A-12B. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE 120 described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE 120 described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE 120 described in connection with FIG. 2. In some aspects, the transmission component 1604 may be co-located with the reception component 1602 in a transceiver.

The reception component 1602 may receive (e.g., from the apparatus 1606) a PSCCH communication and a PSSCH communication in a slot. The decoding component 1608 (or the communication manager 140 using the decoding component 1608) may decode the PSCCH communication using a first delay-Doppler decoder. The decoding component 1608 (or the communication manager 140 using the decoding component 1608) may decode the PSSCH communication using one or more second delay-Doppler decoders.

In some aspects, the identification component 1610 (or the communication manager 140 using the identification component 1610) may identify a location, in the slot, of SCI-2 of the PSSCH communication based at least in part on at least one of an explicit indication, included in the PSCCH communication, of the location of the SCI-2, or a quantity of frequency resources, in the slot, for the SCI-2 and a quantity of frequency resources multiplexed with the PSSCH communication in the slot.

In some aspects, the determination component 1612 (or the communication manager 140 using the determination component 1612) may determine, based at least in part on the SCI-2, that a data portion of the PSSCH communication is not associated with the apparatus 1600, and the decoding component 1608 (or the communication manager 140 using the decoding component 1608) may refrain from decoding the data portion of the PSSCH communication using a fourth delay-Doppler decoder of the one or more second delay-Doppler decoders based at least in part on the determination of the determination component 1612 that the data portion of the PSSCH communication is not intended for the apparatus 1600.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: precoding a physical sidelink control channel (PSCCH) communication using a first delay-Doppler precoder; precoding a physical sidelink shared channel (PSSCH) communication using one or more second delay-Doppler precoders; and transmitting the PSCCH communication and the PSSCH communication in a slot after precoding the PSCCH communication and the PSSCH communication.

Aspect 2: The method of Aspect 1, wherein the first delay-Doppler precoder comprises a first inverse symplectic finite Fourier transform (ISFFT); wherein the one or more second delay-Doppler precoders comprise one or more second ISFFTs; wherein precoding the PSCCH communication comprises converting a plurality of delay-Doppler symbols of the PSCCH communication to a first plurality of time-frequency domain symbols using the first ISFFT; and wherein precoding the PSSCH communication comprises converting a plurality of delay-Doppler symbols of the PSSCH communication to a second plurality of time-frequency domain symbols using the one or more second ISFFTs.

Aspect 3: The method of Aspect 2, further comprising: modulating the first plurality of time-frequency domain symbols and the second plurality of time-frequency domain symbols to generate a time domain signal for the PSCCH communication and the PSSCH communication, wherein transmitting the PSCCH communication and the PSSCH communication comprises transmitting the time domain signal.

Aspect 4: The method of one or more of Aspects 1-3, wherein a quantity of total resources, in the slot, for second stage sidelink channel information (SCI-2) of the PSSCH communication is less than a quantity of total resources that are frequency multiplexed with the PSCCH communication in the slot; and wherein precoding the PSSCH communication using the one or more second delay-Doppler precoders comprises: precoding the SCI-2 and a first data portion of the PSSCH communication using a third delay-Doppler precoder of the one or more second delay-Doppler precoders; and precoding a second data portion of the PSSCH communication using a fourth delay-Doppler precoder of the one or more second delay-Doppler precoders.

Aspect 5: The method of one or more of Aspects 1-4, wherein a quantity of total resources, in the slot, for second stage sidelink channel information (SCI-2) of the PSSCH communication is greater than a quantity of total resources that are frequency multiplexed with the PSCCH communication in the slot; and wherein precoding the PSSCH communication using the one or more second delay-Doppler precoders comprises: precoding a first data portion of the PSSCH communication using a third delay-Doppler precoder of the one or more second delay-Doppler precoders; precoding the SCI-2 and a second data portion of the PSSCH communication using a fourth delay-Doppler precoder of the one or more second delay-Doppler precoders; and precoding a third data portion of the PSSCH communication using a fifth delay-Doppler precoder of the one or more second delay-Doppler precoders.

Aspect 6: The method of one or more of Aspects 1-5, wherein a quantity of total resources, in the slot, for second stage sidelink channel information (SCI-2) of the PSSCH communication is greater than a quantity of total resources that are frequency multiplexed with the PSCCH communication in the slot; and wherein precoding the PSSCH communication using the one or more second delay-Doppler precoders comprises: precoding a first portion of the SCI-2 using a third delay-Doppler precoder of the one or more second delay-Doppler precoders; precoding a second portion of the SCI-2 and a first data portion of the PSSCH communication using a fourth delay-Doppler precoder of the one or more second delay-Doppler precoders; and precoding a second data portion of the PSSCH communication using a fifth delay-Doppler precoder of the one or more second delay-Doppler precoders.

Aspect 7: The method of one or more of Aspects 1-6, wherein a quantity of total resources, in the slot, for second stage sidelink channel information (SCI-2) of the PSSCH communication is equal to a quantity of total resources that are frequency multiplexed with the PSCCH communication in the slot; and wherein precoding the PSSCH communication using the one or more second delay-Doppler precoders comprises: precoding the SCI-2 using a third delay-Doppler precoder of the one or more second delay-Doppler precoders; and precoding a data portion of the PSSCH communication using a fourth delay-Doppler precoder of the one or more second delay-Doppler precoders.

Aspect 8: The method of one or more of Aspects 1-7, wherein transmitting the PSCCH communication and the PSSCH communication comprises transmitting the PSCCH communication and the PSSCH communication with one or more guard subcarriers between frequency resources of the PSCCH communication and frequency resources of the PSSCH communication; wherein the guard subcarriers comprise at least one of: zero-value symbols, or one or more cyclic prefixes of symbols in which the PSCCH communication and the PSSCH communication are transmitted.

Aspect 9: The method of one or more of Aspects 1-8, wherein precoding the PSCCH communication using the one or more first delay-Doppler precoders comprises precoding a plurality of delay-Doppler symbols of the PSCCH communication and a plurality of delay-Doppler symbols of a first demodulation reference signal (DMRS) to a first plurality of time-frequency domain symbols using the one or more first delay-Doppler precoders; and wherein precoding the PSSCH communication using the one or more second delay-Doppler precoders comprises precoding a plurality of delay-Doppler symbols of the PSSCH communication and a plurality of delay-Doppler symbols of a second DMRS to a second plurality of time-frequency domain symbols using the one or more second delay-Doppler precoders.

Aspect 10: A method of wireless communication performed by a user equipment (UE), comprising: receiving a physical sidelink control channel (PSCCH) communication and a physical sidelink shared channel (PSSCH) communication in a slot; decoding the PSCCH communication using a first delay-Doppler decoder; and decoding the PSSCH communication using one or more second delay-Doppler decoders.

Aspect 11: The method of Aspect 10, wherein the first delay-Doppler decoder comprises a first symplectic finite Fourier transform (SFFT); wherein the one or more second delay-Doppler decoders comprise one or more second SFFTs; wherein decoding the PSCCH communication comprises converting a plurality of time-frequency domain symbols of the PSCCH communication to a first plurality of delay-Doppler symbols using the first SFFT; and wherein decoding the PSSCH communication comprises converting a plurality of time-frequency domain symbols of the PSSCH communication to a second plurality of delay-Doppler symbols using the one or more second SFFTs.

Aspect 12: The method of Aspect 10 or 11, wherein a quantity of total resources, in the slot, for second stage sidelink channel information (SCI-2) of the PSSCH communication is less than a quantity of total resources that are frequency multiplexed with the PSCCH communication in the slot; and wherein decoding the PSSCH communication using the one or more second delay-Doppler decoders comprises: decoding the SCI-2 and a first data portion of the PSSCH communication using a third delay-Doppler decoder of the one or more second delay-Doppler decoders; and decoding a second data portion of the PSSCH communication using a fourth delay-Doppler decoder of the one or more second delay-Doppler decoders.

Aspect 13: The method of one or more of Aspects 10-12, wherein a quantity of total resources, in the slot, for second stage sidelink channel information (SCI-2) of the PSSCH communication is greater than a quantity of total resources that are frequency multiplexed with the PSCCH communication in the slot; and wherein decoding the PSSCH communication using the one or more second delay-Doppler decoders comprises: decoding a first data portion of the PSSCH communication using a third delay-Doppler decoder of the one or more second delay-Doppler decoders; decoding the SCI-2 and a second data portion of the PSSCH communication using a fourth delay-Doppler decoder of the one or more second delay-Doppler decoders; and decoding a third data portion of the PSSCH communication using a fifth delay-Doppler decoder of the one or more second delay-Doppler decoders.

Aspect 14: The method of one or more of Aspects 10-13, wherein a quantity of total resources, in the slot, for second stage sidelink channel information (SCI-2) of the PSSCH communication is greater than a quantity of total resources that are frequency multiplexed with the PSCCH communication in the slot; and wherein decoding the PSSCH communication using the one or more second delay-Doppler decoders comprises: decoding a first portion of the SCI-2 using a third delay-Doppler decoder of the one or more second delay-Doppler decoders; decoding a second portion of the SCI-2 and a first data portion of the PSSCH communication using a fourth delay-Doppler decoder of the one or more second delay-Doppler decoders; and decoding a second data portion of the PSSCH communication using a fifth delay-Doppler decoder of the one or more second delay-Doppler decoders.

Aspect 15: The method of one or more of Aspects 10-14, wherein a quantity of total resources, in the slot, for second stage sidelink channel information (SCI-2) of the PSSCH communication is equal to a quantity of total resources that are frequency multiplexed with the PSCCH communication in the slot; and wherein decoding the PSSCH communication using the one or more second delay-Doppler decoders comprises: decoding the SCI-2 using a third delay-Doppler decoder of the one or more second delay-Doppler decoders; and decoding a data portion of the PSSCH communication using a fourth delay-Doppler decoder of the one or more second delay-Doppler decoders.

Aspect 16: The method of Aspect 10, wherein decoding the PSCCH communication using the one or more first delay-Doppler decoders comprises decoding a plurality of delay-Doppler symbols of the PSSCH communication and a plurality of delay-Doppler symbols of a first demodulation reference signal (DMRS) to a first plurality of time-frequency domain symbols using the one or more first delay-Doppler decoders; and wherein decoding the PSSCH communication using the one or more second delay-Doppler decoders comprises decoding a plurality of delay-Doppler symbols of the PSSCH communication and a plurality of delay-Doppler symbols of a second DMRS to a second plurality of time-frequency domain symbols using the one or more second delay-Doppler decoders.

Aspect 17: The method of one or more of Aspects 10-16, further comprising: identifying a location, in the slot, of second stage sidelink channel information (SCI-2) of the PSSCH communication based at least in part on at least one of: an explicit indication, included in the PSCCH communication, of the location of the SCI-2, or a quantity of frequency resources, in the slot, for the SCI-2 and a quantity of frequency resources multiplexed with the PSSCH communication in the slot.

Aspect 18: The method of one or more of Aspects 10-17, wherein decoding the PSSCH communication using the one or more second delay-Doppler decoders comprises decoding second stage sidelink channel information (SCI-2) of the PSSCH communication using a third delay-Doppler decoder of the one or more second delay-Doppler decoders; and wherein the method further comprises: determining, based at least in part on the SCI-2, that a data portion of the PSSCH communication is not associated with the UE; and refraining from decoding the data portion of the PSSCH communication using a fourth delay-Doppler decoder of the one or more second delay-Doppler decoders based at least in part on determining that the data portion of the PSSCH communication is not intended for the UE.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      precode a physical sidelink control channel (PSCCH) communication using a first delay-Doppler precoder;
      precode a physical sidelink shared channel (PSSCH) communication using one or more second delay-Doppler precoders; and
      transmit the PSCCH communication and the PSSCH communication in a slot after precoding the PSCCH communication and the PSSCH communication.

2. The UE of claim 1, wherein the first delay-Doppler precoder comprises a first inverse symplectic finite Fourier transform (ISFFT);
   wherein the one or more second delay-Doppler precoders comprise one or more second ISFFTs;
   wherein the one or more processors, to precode the PSCCH communication, are configured to convert a plurality of delay-Doppler symbols of the PSCCH communication to a first plurality of time-frequency domain symbols using the first ISFFT; and
   wherein the one or more processors, to precode the PSSCH communication, are configured to convert a plurality of delay-Doppler symbols of the PSSCH communication to a second plurality of time-frequency domain symbols using the one or more second ISFFTs.

3. The UE of claim 2, wherein the one or more processors are further configured to:
   modulate the first plurality of time-frequency domain symbols and the second plurality of time-frequency domain symbols to generate a time domain signal for the PSCCH communication and the PSSCH communication; and
   wherein the one or more processors, to transmit the PSCCH communication and the PSSCH communication, are configured to transmit the time domain signal.

4. The UE of claim 1, wherein a quantity of total resources, in the slot, for second stage sidelink control information (SCI-2) of the PSSCH communication is less than a quantity of total resources that are frequency multiplexed with the PSCCH communication in the slot; and
   wherein the one or more processors, to precode the PSSCH communication using the one or more second delay-Doppler precoders, are configured to:
      precode the SCI-2 and a first data portion of the PSSCH communication using a third delay-Doppler precoder of the one or more second delay-Doppler precoders; and
      precode a second data portion of the PSSCH communication using a fourth delay-Doppler precoder of the one or more second delay-Doppler precoders.

5. The UE of claim 1, wherein a quantity of total resources, in the slot, for second stage sidelink control information (SCI-2) of the PSSCH communication is greater than a quantity of total resources that are frequency multiplexed with the PSCCH communication in the slot; and
   wherein the one or more processors, to precode the PSSCH communication using the one or more second delay-Doppler precoders, are configured to:
      precode a first data portion of the PSSCH communication using a third delay-Doppler precoder of the one or more second delay-Doppler precoders;
      precode the SCI-2 and a second data portion of the PSSCH communication using a fourth delay-Doppler precoder of the one or more second delay-Doppler precoders; and
      precode a third data portion of the PSSCH communication using a fifth delay-Doppler precoder of the one or more second delay-Doppler precoders.

6. The UE of claim 1, wherein a quantity of total resources, in the slot, for second stage sidelink control information (SCI-2) of the PSSCH communication is greater than a quantity of total resources that are frequency multiplexed with the PSCCH communication in the slot; and
   wherein the one or more processors, to precode the PSSCH communication using the one or more second delay-Doppler precoders, are configured to:
      precode a first portion of the SCI-2 using a third delay-Doppler precoder of the one or more second delay-Doppler precoders;
      precode a second portion of the SCI-2 and a first data portion of the PSSCH communication using a fourth delay-Doppler precoder of the one or more second delay-Doppler precoders; and
      precode a second data portion of the PSSCH communication using a fifth delay-Doppler precoder of the one or more second delay-Doppler precoders.

7. The UE of claim 1, wherein a quantity of total resources, in the slot, for second stage sidelink control information (SCI-2) of the PSSCH communication is equal to a quantity of total resources that are frequency multiplexed with the PSCCH communication in the slot; and
   wherein the one or more processors, to precode the PSSCH communication using the one or more second delay-Doppler precoders, are configured to:
      precode the SCI-2 using a third delay-Doppler precoder of the one or more second delay-Doppler precoders; and
      precode a data portion of the PSSCH communication using a fourth delay-Doppler precoder of the one or more second delay-Doppler precoders.

8. The UE of claim 1, wherein the one or more processors, to transmit the PSCCH communication and the PSSCH communication, are configured to transmit the PSCCH communication and the PSSCH communication with one or more guard subcarriers between frequency resources of the PSCCH communication and frequency resources of the PSSCH communication;
   wherein the one or more guard subcarriers comprise at least one of:
      zero-value symbols, or
      one or more cyclic prefixes of symbols in which the PSCCH communication and the PSSCH communication are transmitted.

9. The UE of claim 1, wherein the one or more processors, to precode the PSCCH communication using the first delay-Doppler precoder, are configured to precode a plurality of delay-Doppler symbols of the PSCCH communication and a plurality of delay-Doppler symbols of a first demodulation reference signal (DMRS) to a first plurality of time-frequency domain symbols using the first delay-Doppler precoder; and wherein the one or more processors, to precode the PSSCH communication using the one or more second delay-Doppler precoders, are configured to precode a plurality of delay-Doppler symbols of the PSSCH communication and a plurality of delay-Doppler symbols of a second DMRS to a second plurality of time-frequency domain symbols using the one or more second delay-Doppler precoders.

10. A UE for wireless communication, comprising:
a memory; and
one or more processors, coupled to the memory, configured to:
receive a physical sidelink control channel (PSCCH) communication and a physical sidelink shared channel (PSSCH) communication in a slot;
decode the PSCCH communication using a first delay-Doppler decoder; and
decode the PSSCH communication using one or more second delay-Doppler decoders.

11. The UE of claim 10, wherein the first delay-Doppler decoder comprises a first symplectic finite Fourier transform (SFFT);
wherein the one or more second delay-Doppler decoders comprise one or more second SFFTs;
wherein the one or more processors, to decode the PSCCH communication, are configured to convert a plurality of time-frequency domain symbols of the PSCCH communication to a first plurality of delay-Doppler symbols using the first SFFT; and
wherein the one or more processors, to decode the PSSCH communication, are configured to convert a plurality of time-frequency domain symbols of the PSSCH communication to a second plurality of delay-Doppler symbols using the one or more second SFFTs.

12. The UE of claim 10, wherein a quantity of total resources, in the slot, for second stage sidelink control information (SCI-2) of the PSSCH communication is less than a quantity of total resources that are frequency multiplexed with the PSCCH communication in the slot; and
wherein the one or more processors, to decode the PSSCH communication using the one or more second delay-Doppler decoders, are configured to:
decode the SCI-2 and a first data portion of the PSSCH communication using a third delay-Doppler decoder of the one or more second delay-Doppler decoders; and
decode a second data portion of the PSSCH communication using a fourth delay-Doppler decoder of the one or more second delay-Doppler decoders.

13. The UE of claim 10, wherein a quantity of total resources, in the slot, for second stage sidelink control information (SCI-2) of the PSSCH communication is greater than a quantity of total resources that are frequency multiplexed with the PSCCH communication in the slot; and
wherein the one or more processors, to decode the PSSCH communication using the one or more second delay-Doppler decoders, are configured to:
decode a first data portion of the PSSCH communication using a third delay-Doppler decoder of the one or more second delay-Doppler decoders;
decode the SCI-2 and a second data portion of the PSSCH communication using a fourth delay-Doppler decoder of the one or more second delay-Doppler decoders; and
decode a third data portion of the PSSCH communication using a fifth delay-Doppler decoder of the one or more second delay-Doppler decoders.

14. The UE of claim 10, wherein a quantity of total resources, in the slot, for second stage sidelink control information (SCI-2) of the PSSCH communication is greater than a quantity of total resources that are frequency multiplexed with the PSCCH communication in the slot; and
wherein the one or more processors, to decode the PSSCH communication using the one or more second delay-Doppler decoders, are configured to:
decode a first portion of the SCI-2 using a third delay-Doppler decoder of the one or more second delay-Doppler decoders;
decode a second portion of the SCI-2 and a first data portion of the PSSCH communication using a fourth delay-Doppler decoder of the one or more second delay-Doppler decoders; and
decode a second data portion of the PSSCH communication using a fifth delay-Doppler decoder of the one or more second delay-Doppler decoders.

15. The UE of claim 10, wherein a quantity of total resources, in the slot, for second stage sidelink control information (SCI-2) of the PSSCH communication is equal to a quantity of total resources that are frequency multiplexed with the PSCCH communication in the slot; and
wherein the one or more processors, to decode the PSSCH communication using the one or more second delay-Doppler decoders, are configured to:
decode the SCI-2 using a third delay-Doppler decoder of the one or more second delay-Doppler decoders; and
decode a data portion of the PSSCH communication using a fourth delay-Doppler decoder of the one or more second delay-Doppler decoders.

16. The UE of claim 10, wherein the one or more processors, to decode the PSCCH communication using the first delay-Doppler decoder, are configured to decode a plurality of delay-Doppler symbols of the PSSCH communication and a plurality of delay-Doppler symbols of a first demodulation reference signal (DMRS) to a first plurality of time-frequency domain symbols using the first delay-Doppler decoder; and
wherein the one or more processors, to decode the PSSCH communication using the one or more second delay-Doppler decoders, are configured to decode a plurality of delay-Doppler symbols of the PSSCH communication and a plurality of delay-Doppler symbols of a second DMRS to a second plurality of time-frequency domain symbols using the one or more second delay-Doppler decoders.

17. The UE of claim 10, wherein the one or more processors are further configured to:
identify a location, in the slot, of second stage sidelink control information (SCI-2) of the PSSCH communication based at least in part on at least one of:
an explicit indication, included in the PSCCH communication, of the location of the SCI-2, or
a quantity of frequency resources, in the slot, for the SCI-2 and a quantity of frequency resources multiplexed with the PSSCH communication in the slot.

18. The UE of claim 10, wherein the one or more processors, to decode the PSSCH communication using the one or more second delay-Doppler decoders, are configured to decode second stage sidelink control information (SCI-2)

of the PSSCH communication using a third delay-Doppler decoder of the one or more second delay-Doppler decoders; and wherein the one or more processors are further configured to:
determine, based at least in part on the SCI-2, that a data portion of the PSSCH communication is not associated with the UE; and
refrain from decoding the data portion of the PSSCH communication using a fourth delay-Doppler decoder of the one or more second delay-Doppler decoders based at least in part on determining that the data portion of the PSSCH communication is not intended for the UE.

19. A method of wireless communication performed by a user equipment (UE), comprising:
precoding a physical sidelink control channel (PSCCH) communication using a first delay-Doppler precoder;
precoding a physical sidelink shared channel (PSSCH) communication using one or more second delay-Doppler precoders; and
transmitting the PSCCH communication and the PSSCH communication in a slot after precoding the PSCCH communication and the PSSCH communication.

20. The method of claim 19, wherein a quantity of total resources, in the slot, for second stage sidelink control information (SCI-2) of the PSSCH communication is less than a quantity of total resources that are frequency multiplexed with the PSCCH communication in the slot; and
wherein precoding the PSSCH communication using the one or more second delay-Doppler precoders comprises:
precoding the SCI-2 and a first data portion of the PSSCH communication using a third delay-Doppler precoder of the one or more second delay-Doppler precoders; and
precoding a second data portion of the PSSCH communication using a fourth delay-Doppler precoder of the one or more second delay-Doppler precoders.

21. The method of claim 19, wherein a quantity of total resources, in the slot, for second stage sidelink control information (SCI-2) of the PSSCH communication is greater than a quantity of total resources that are frequency multiplexed with the PSCCH communication in the slot; and
wherein precoding the PSSCH communication using the one or more second delay-Doppler precoders comprises:
precoding a first data portion of the PSSCH communication using a third delay-Doppler precoder of the one or more second delay-Doppler precoders;
precoding the SCI-2 and a second data portion of the PSSCH communication using a fourth delay-Doppler precoder of the one or more second delay-Doppler precoders; and
precoding a third data portion of the PSSCH communication using a fifth delay-Doppler precoder of the one or more second delay-Doppler precoders.

22. The method of claim 19, wherein a quantity of total resources, in the slot, for second stage sidelink control information (SCI-2) of the PSSCH communication is greater than a quantity of total resources that are frequency multiplexed with the PSCCH communication in the slot; and
wherein precoding the PSSCH communication using the one or more second delay-Doppler precoders comprises:
precoding a first portion of the SCI-2 using a third delay-Doppler precoder of the one or more second delay-Doppler precoders;
precoding a second portion of the SCI-2 and a first data portion of the PSSCH communication using a fourth delay-Doppler precoder of the one or more second delay-Doppler precoders; and
precoding a second data portion of the PSSCH communication using a fifth delay-Doppler precoder of the one or more second delay-Doppler precoders.

23. The method of claim 19, wherein a quantity of total resources, in the slot, for second stage sidelink control information (SCI-2) of the PSSCH communication is equal to a quantity of total resources that are frequency multiplexed with the PSCCH communication in the slot; and
wherein precoding the PSSCH communication using the one or more second delay-Doppler precoders comprises:
precoding the SCI-2 using a third delay-Doppler precoder of the one or more second delay-Doppler precoders; and
precoding a data portion of the PSSCH communication using a fourth delay-Doppler precoder of the one or more second delay-Doppler precoders.

24. A method of wireless communication performed by a user equipment (UE), comprising:
receiving a physical sidelink control channel (PSCCH) communication and a physical sidelink shared channel (PSSCH) communication in a slot;
decoding the PSCCH communication using a first delay-Doppler decoder; and
decoding the PSSCH communication using one or more second delay-Doppler decoders.

25. The method of claim 24, wherein a quantity of total resources, in the slot, for second stage sidelink control information (SCI-2) of the PSSCH communication is less than a quantity of total resources that are frequency multiplexed with the PSCCH communication in the slot; and
wherein decoding the PSSCH communication using the one or more second delay-Doppler decoders comprises:
decoding the SCI-2 and a first data portion of the PSSCH communication using a third delay-Doppler decoder of the one or more second delay-Doppler decoders; and
decoding a second data portion of the PSSCH communication using a fourth delay-Doppler decoder of the one or more second delay-Doppler decoders.

26. The method of claim 24, wherein a quantity of total resources, in the slot, for second stage sidelink control information (SCI-2) of the PSSCH communication is greater than a quantity of total resources that are frequency multiplexed with the PSCCH communication in the slot; and
wherein decoding the PSSCH communication using the one or more second delay-Doppler decoders comprises:
decoding a first data portion of the PSSCH communication using a third delay-Doppler decoder of the one or more second delay-Doppler decoders;
decoding the SCI-2 and a second data portion of the PSSCH communication using a fourth delay-Doppler decoder of the one or more second delay-Doppler decoders; and
decoding a third data portion of the PSSCH communication using a fifth delay-Doppler decoder of the one or more second delay-Doppler decoders.

27. The method of claim 24, wherein a quantity of total resources, in the slot, for second stage sidelink control information (SCI-2) of the PSSCH communication is greater than a quantity of total resources that are frequency multiplexed with the PSCCH communication in the slot; and
    wherein decoding the PSSCH communication using the one or more second delay-Doppler decoders comprises:
        decoding a first portion of the SCI-2 using a third delay-Doppler decoder of the one or more second delay-Doppler decoders;
        decoding a second portion of the SCI-2 and a first data portion of the PSSCH communication using a fourth delay-Doppler decoder of the one or more second delay-Doppler decoders; and
        decoding a second data portion of the PSSCH communication using a fifth delay-Doppler decoder of the one or more second delay-Doppler decoders.

28. The method of claim 24, wherein a quantity of total resources, in the slot, for second stage sidelink control information (SCI-2) of the PSSCH communication is equal to a quantity of total resources that are frequency multiplexed with the PSCCH communication in the slot; and
    wherein decoding the PSSCH communication using the one or more second delay-Doppler decoders comprises:
        decoding the SCI-2 using a third delay-Doppler decoder of the one or more second delay-Doppler decoders; and
        decoding a data portion of the PSSCH communication using a fourth delay-Doppler decoder of the one or more second delay-Doppler decoders.

29. The method of claim 24, further comprising:
    identifying a location, in the slot, of second stage sidelink control information (SCI-2) of the PSSCH communication based at least in part on at least one of:
        an explicit indication, included in the PSCCH communication, of the location of the SCI-2, or
        a quantity of frequency resources, in the slot, for the SCI-2 and a quantity of frequency resources multiplexed with the PSSCH communication in the slot.

30. The method of claim 24, wherein decoding the PSSCH communication using the one or more second delay-Doppler decoders comprises decoding second stage sidelink control information (SCI-2) of the PSSCH communication using a third delay-Doppler decoder of the one or more second delay-Doppler decoders; and
    wherein the method further comprises:
        determining, based at least in part on the SCI-2, that a data portion of the PSSCH communication is not associated with the UE; and
        refraining from decoding the data portion of the PSSCH communication using a fourth delay-Doppler decoder of the one or more second delay-Doppler decoders based at least in part on determining that the data portion of the PSSCH communication is not intended for the UE.

\* \* \* \* \*